United States Patent [19]
Kirino et al.

[11] Patent Number: 5,654,058
[45] Date of Patent: Aug. 5, 1997

[54] MAGNETO-OPTICAL DISK

[75] Inventors: Fumiyoshi Kirino, Tokyo; Harukazu Miyamoto; Shigenori Okamine, both of Kodaira; Noriyuki Ogihara, Ibaraki-ken; Masahiko Takahashi, Hachioji; Norio Ohta, Iruma; Toshio Niihara, Sayama, all of Japan

[73] Assignees: Hitachi, Ltd., Tokyo; Hitachi Maxell, Ltd., Osaka, both of Japan

[21] Appl. No.: 310,006

[22] Filed: Sep. 21, 1994

Related U.S. Application Data

[63] Continuation of Ser. No. 432,002, Nov. 6, 1989, abandoned.

[30] Foreign Application Priority Data

| | | | |
|---|---|---|---|
| Nov. 7, 1988 | [JP] | Japan | 63-279235 |
| Dec. 5, 1988 | [JP] | Japan | 63-306051 |
| Dec. 5, 1988 | [JP] | Japan | 63-306053 |
| Feb. 27, 1989 | [JP] | Japan | 1-043011 |

[51] Int. Cl.$^6$ .................................... G11B 5/66
[52] U.S. Cl. .................. 428/64.3; 428/694 DE; 428/694 XS; 428/694 NF; 428/694 RE; 428/694 AT; 428/694 MM; 428/900; 368/13
[58] Field of Search ............ 428/694 DE, 694 XS, 428/694 NF, 900, 64.3, 694 RE, 694 MT, 694 MM; 369/13

[56] References Cited

U.S. PATENT DOCUMENTS

| | | | |
|---|---|---|---|
| 4,664,977 | 5/1987 | Osato et al. | 428/336 |
| 4,719,137 | 1/1988 | Ohta et al. | 428/67 |
| 4,839,883 | 6/1989 | Nagaba et al. | 369/286 |

FOREIGN PATENT DOCUMENTS

| | | |
|---|---|---|
| 192256 | 8/1986 | European Pat. Off. . |
| 0192256 | 8/1986 | European Pat. Off. . |
| 233034 | 8/1987 | European Pat. Off. . |
| 0233034 | 8/1987 | European Pat. Off. . |
| 62-137743 | 5/1987 | Japan . |

*Primary Examiner*—Leszek Kiliman
*Attorney, Agent, or Firm*—Pennie & Edmonds

[57] ABSTRACT

In a magneto-optical disk for recording, reproduction or erasing with a laser beam, which comprises a film of four-layer structure consisting of a first dielectric layer, a magneto-optical recording layer, a second dielectric layer and a metallic layer, laid on a disk substrate provided with guide tracks, temperature distribution of the magneto-optical recording layer is controlled by controlling the thermal diffusivity of the metallic layer, and recording/reproduction/erasing repetition characteristics are improved thereby. In the disk of the present structure, the temperature is elevated in a broader area from the center of laser beam, and thus a thoroughly broad erasing domain width taking a track offset into account can be obtained and no recording domains remain after the erasing. The reproduced signal output is increased by 4 dB, as compared with that obtained by a disk of three-layer structure without any metallic layer, because the beam utilization efficiency is increased owing to both Kerr effect and Faraday effect. When the disk of the present structure is subjected to field modulation recording, tails of arrow-feather-shaped recording domains peculiar to the field modulation recording can be shortened and interbit interferences can be overcome, resulting in an increase in C/N (S/N) ratio and the high density recording can be made.

5 Claims, 18 Drawing Sheets

MAGNETO-OPTICAL DISK

This is a continuation of application Ser. No. 07/432,002, filed Nov. 6, 1989, now abandoned.

BACKGROUND OF THE INVENTION

This invention relates to a magneto-optical recording capable of recording medium, reproducing/erasing with a laser beam, and more particularly to the structure of a magneto-optical disk effective for the suppression of deterioration in the reproduction output due to repetitions of recording/erasing, while maintaining a high S/N and also for the control of shape of a formed recording domain.

With the recent progress toward a highly informational society, needs for a file memory of larger capacity and higher density are now increasing and optical disks have been regarded as a response to these needs. Particularly, magneto-optical recording is now to be used in the form of a practical, rewritable optical disk. Currently known layer structures are classified into two types, i.e. three-layer structure (underlayer/recording layer/protective layer) and four-layer structure (underlayer/recording layer/protective layer/metallic layer). Most importantly, disks of a four-layer structure utilize both the Kerr effect and the Faraday effect of magneto-optical recording layer concurrently and thus a large rotational angle can be obtained and, also the reproduction output can be increased at the driving. Therefore, disks of a four-layer structure are now extensively studied and are under development.

On the other hand, studies on higher density and higher speed are also underway. For example, it has been proposed to utilize a field modulation recording system, a system for using a double layer based on an exchange couple, etc. in order to attain the overwritting. In order to attain a higher density, it has been studied to form micromagnetic domains or to use pit edge recording. In any event, disks having a high S/N and a good controllability of magnetic domains are required. If magneto-optical disks can be used not only in computer file memory, but also for domestic purposes for example as rewritable compact disks, a larger requirement will be posed on the development. The first condition for this purpose is a lower cost. To satisfy the condition, it is necessary to use low cost plastics as substrate materials and to make the disk structure as simple as possible. This can be attained only as a result of of improvements in disk technology such as (1) technology of preparating substrates, (2) technology of making a magneto-optical recording layer of higher corrosion resistance and (3) optimization of disk structure, etc. In particular, the technology of making a magneto-optical recording layer of higher corrosion resistance, as mentioned in (2), is important.

In the above-mentioned disk technology, research and development have been thus far concentrated on an increase in the rotational angle, while no particular consideration has been paid to the decrease in disk characteristics, especially reproduction output, when recording/erasing are repeated, and therefore no higher reliability has been obtained. This decrease in disk performance results from the amorphous state of magneto-optical recording layers being relaxed by a laser beam used for the recording/erasing.

In the case of higher density recording by field modulation recording, recording domains themselves interfere with one another or no better shapes of recording domains are obtained, and thus no satisfactory reproduction output is obtained. This is because parts in a larger ratio of the domain wall to the domain area exist and consequently the energy of the domain wall is so high that the shapes of recording domains become unstable.

Furthermore, in the case of domestic applications, etc. on the other hand, no satisfactory simplification of layer structure has been made yet, resulting in poor mass production and higher cost. In other words the magneto-optical disks have been found to be unsuitable for the domestic applications. Still furthermore, an underlayer made mainly of inorganic compounds must have a thickness of at least 750 Å, in view of the optical effect. This increases an overall stress of the magneto-optical recording medium and causes the underlayer to peel off, especially when formed on a plastic substrate. In order to prevent such a peeling, it has been attempted to reduce the stress on the underlayer of inorganic compounds or to apply some treatment to the substrate surface. The thickness of the underlayer of inorganic compound has been restricted to 700–900 Å in view of the optical characteristics, which case the recording layer has been sometimes corroded via pinholes existing in the underlayer.

SUMMARY OF THE INVENTION

An object of the present invention is to provide a magneto-optical disk having a high reliability in the reproduction of recorded information by suppressing a decrease in the reproduced signal output due to a decrease in the energy of perpendicular magnetic anisotropy, caused by a change in the magnetic characteristics owing to the structure relaxation of amorphous magneto-optical recording layer when subjected to repetitions of recording/reproduction/erasing (W/R/E).

Another object of the present invention is to provide a high density, magneto-optical disk capable of obtaining improved shapes of recording domains by controlling the heat passing through the disk at the time of recording or reproduction.

In an optical disk that conducts recording/reproduction/erasing with a laser beam, the reproduction output is sometimes lowered when recording/reproduction/erasing (W/R/E) are repeated. Thus, there has been a problem of low reliability, causing a disk error, etc. Thus, it is an urgent need to suppress the decrease in the reproduction output when recording/reproduction/erasing are repeated. To this end, a film of 4-layer structure comprising a first dielectric layer, a magneto-optical recording layer, a second dielectric layer and a metallic layer, laid successively in that order on a disk substrate has been proposed to cause a heat flow from the magneto-optical recording layer while controlling the heat flow in the film. The thermal conductivity of the metallic protective layer can be controlled by one of the following three methods: 1) by selecting a metallic layer material from at least one of Al, Au, Pt, Rh, Pd and Cu as the host element, 2) by making an alloy from one of Al, Au, Pt, Rh, Pd and Cu as the host elements and at least one of unselected host elements or preferably 1 to 30 at. % of at least one element of Nl, Ta, Ti, Zr, Co, Mn and Cr, and 3) by adjusting the thickness of the metallic layer (i.e. changing the heat capacity). To facilitate heat flow from the magneto-optical recording layer, it is also possible to adjust the thickness of the magneto-optical recording layer, etc. With the a four-layer film structure, the magneto-optical layer is apparently very liable to be heated or cooled. In the three-layer film without the metallic layer, on the other hand, heat is accumulated in the dielectric layer as the third layer and thus the maximum attainable temperature of the magneto-optical recording layer becomes higher. The structural relaxation therefore is liable to take place on the magneto-optical recording layer, further because the high temperature region is broader. Thus, the heat flow will have an important meaning. This heat effect is more pronounced when erasing. When erasing, an erasing magnetic domain having a large width must be formed in view of the track offset. In order to obtain a magnetic domain width of 1.3 µm, the beam spot center region, 0.5 µm in diameter, has a temperature of 300° C. or higher in the case of the film of three-layer structure, on the other hand there is no such a region having a temperature of 300° C. or higher in the case of the film of four-layer structure. This difference is shown as a difference in the change of reproduction output when recording/erasing are repeated.

In addition, at least one compound selected from aluminum nitride, silicon nitride, germanium nitride, silicon oxide, zinc sulfide, zirconium oxide and stabilized zirconia or double oxides, or oxide-nitrides of these compounds are used as materials for the first and second dielectric layers in the film.

Amorphous alloys of rare earth elements and iron group elements having a perpendicular magnetization anisotropy, more specifically alloys comprising one or two elements selected from Tb, Dy, Ho and Gd, and at least one element selected from Fe, Co, Nb, Ti, Ta, Cr, Rh, Pd, Au and Pt, the alloys containing one or both of Fe and Co are used as materials for the magneto-optical recording layer. In addition, alloys in which a portion of the abovementioned rare earth element is replaced with at least one element selected from Nd, Pr, Ce and Sm may be used.

Furthermore, the temperature distribution of the magneto-optical recording layer can be controlled by adjusting the Kerr enhancement effect by light multiple interference effect of the first and second dielectric layers. In the case of adjusting the Kerr enhancement effect, a (Kerr+Faraday) rotational angle sometimes changes largely, and thus the adjustment must be carefully made. In the formation of the metallic layer as a fourth layer, a corrosion resistance can be obtained (higher reliability) by combining a material of high reflectivity such as Al, Cu, Rh, Pd, Au or Pt with a material of high corrosion resistance such as Ni, Nb, Ta, Ti, Zr, Co, Mn or Cr, thereby producing a concentrating gradient in the composition or by providing a layer of the material of high reflectivity and another layer of the material of high corrosion resistance to make two layers, while maintaining the high reflectivity (an increase in C/N), and furthermore the change in the reproduction output due to repetitions of recording/reproduction/erasing (W/R/E) can be controlled.

Still furthermore, when a magneto-optical recording disk of the structure of the present invention is subjected to recording by field modulation recording, the "tail" of recording domain peculiar to the field modulation recording can be eliminated, and recording at a higher density and with better disk characteristics (higher C/N ratio) can be obtained.

When a magneto-optical disk of four-layer structure having a metallic layer, as mentioned above, is subjected to recording by field modulation recording, the controllability of shapes of recording domains can be improved and high density recording can be obtained by making the length of tails of the recording domain in the moving direction of a high beam smaller than 0.7 times the width of the recording domains in the direction perpendicular to the moving direction of the light beam.

In order to control the thermal diffusivity of a magneto-optical recording medium, that is, to cause a heat flow from the magneto-optical recording medium, or to make the length of the tail of recording domain smaller, the magneto-optical disk must comprise a magneto-optical recording layer and a metallic layer.

Furthermore, in order to control the thermal diffusivity of the magneto-optical recording medium or makes the length of the tail of recording domain smaller, the magneto-optical disk must comprises at least a magneto-optical recording layer, a metallic layer and a dielectric layer, where the dielectric layer is provided between the magneto-optical recording layer and the metallic layer. The magneto-optical disk or magneto-optical recording medium, as referred to in the specification, comprises a magneto-optical recording layer, a dielectric layer and a metallic layer, laid successively on a disk substrate.

In order to control the thermal diffusivity of the magneto-optical recording medium of the present invention, or make the length of the tail of recording domain smaller, the magneto-optical recording medium of the present invention must satisfy the following condition:

$$K_M > vD$$

wherein
$K_M$: thermal diffusivity of metallic layer
v: relative speed of light beam to magneto-optical recording medium
D: diameter of beam spot Furthermore, in order to control the thermal diffusivity of the magneto-optical recording medium or make the length of the tail of recording domain smaller, the magneto-optical recording medium of the present invention must satisfy the following condition:

$$K_D < K_M$$

wherein
$K_D$: thermal diffusivity of dielectric layer
$K_M$: thermal diffusivity of metallic layer Still furthermore, in order to control the thermal diffusivity of the magneto-optical recording medium of the present invention and make the length of the tail of recording domain smaller, the magneto-optical recording medium of the present invention must satisfy the following condition:

$$K_R \cdot l_R < K_M \cdot l_M$$

wherein
$K_R$: thermal diffusivity of magnetic layer
lR: thickness of magneto-optical recording layer
$K_M$: thermal diffusivity of metallic layer
lM: thickness of metallic layer Still furthermore, in order to control the thermal diffusivity of the magneto-optical recording medium of the present invention or make the length of the tail of recording domain smaller, the magneto-optical recording medium of the present invention must satisfy the following condition:

$$K_D > \frac{4l_D^2 v}{D}$$

wherein
$K_D$: thermal diffusivity of dielectric layer
lD: thickness of dielectric layer
v: relative speed of movement of light beam to magneto-optical recording medium D: diameter of beam spot Still furthermore, in order to control the thermal diffusivity of the magneto-optical recording medium of the present invention or make the length of the tail of recording domain smaller, the magneto-optical recording medium of the present invention must satisfy the following condition:

$$K_M > K_R$$

Still furthermore, in order to control the thermal diffusivity of the magneto-optical recording medium of the present invention or make the length of the tail of recording domain smaller, the metallic layer is made of at least one of Al, Au, Ag, Cu, Pt, and Rh.

Still furthermore, in order to control the thermal diffusivity of the magneto-optical recording medium of the present invention or make the length of the tail of recording domain smaller, the metallic layer contains not more than 30 at. % of at least one element selected from Ni, Ti, Ta, Cr, Ni, Mn and Zr.

Still furthermore, in order to control the thermal diffusivity of the magneto-optical recording medium of the present invention or make the length of the tail of magnetic domain smaller, the dielectric layer is composed of one or a mixture or compound of two or more of $AlN_x$, $SiN_x$, $ZrO_x$, $SiO_x$, $TaO_x$, ZnS, $ZnO_x$, $TiO_x$, $Y_2O_3$ and $Sm_2O_3$.

On the other hand, in a magneto-optical disk comprising a first dielectric layer, a recording layer, second dielectric layer and a metallic layer, laid successively on a disk substrate having guide tracks, the decrease in the reliability can be prevented by endowing a Kerr enhancement action by multiple interference to the second dielectric layer and endowing a protective action mainly to the first dielectric layer, whereby the reliability can be made higher and the duration longer. The depth of guide tracks depends on the wavelength of light beam used. Since a semiconductor layer having a wavelength of 822 nm is now used, the depth of the guide tracks is then about 800 Å. Thus, the necessary thickness of the first dielectric layer for complete coverage of the guide tracks is 1,000 Å or more and 1,300 Å or more for more effective coverage.

The thickness of the second dielectric layer having a Kerr enhancement action depends on the wavelength of the light beam and the refractive index of the layer. In that case, the thickness of the magneto-optical recording layer is important and if there is much absorption of light beam, the disk characteristics are deteriorated. Thus, case must be paid to this fact. The magneto-optical recording layer is not more than 400 Å. At the same time, a change in the magnetic characteristics is also important, because the Kerr rotational angle and the coercive force change only by a change in the layer thickness, and thus care should be paid also to this fact in the preparation of the disks.

It is not the gist of the present invention what materials are to be used for the magneto-optical recording layer and the metallic layer, but the gist of the present invention is to allocate a Kerr enhancement action to the second dielectric layer and a protective action to the first dielectric layer to increase the reliability and duration of the disk without deteriorating the disk characteristics. By, allocating the Kerr enhancement action to the second dielectric layer, a difference in the refractive index in the upper and lower layers provided at both sides of the second dielectric layer can be made larger as a second effect than by allocating the Kerr enhancement action to the first dielectric layer. Consequently the enhancement ratio of Kerr rotational angle can be increased, resulting in an increase in the reproduced signal output and improvements in disk characteristics. With this structure, both the Kerr rotational angle $\theta_k$ and reflectivity R become larger than by allocating the Kerr enhancement action to the first dielectric layer, and also the figure of merit $\phi\sqrt{R}\cdot\theta_k$ can be increased. Generally, the larger $\theta_k$, the lower R. However, this structure, both $\theta_k$ and R can be increased at the same time, and this is one of the features of the present invention. The reflectivity is obtained between the first dielectric layer and the recording layer and the Kerr rotational angle is enhanced in the second dielectric layer in the present invention.

In order to obtain a magneto-optical recording medium for low end domestic applications, a low cost disk substrate made of, for example, plastics must be used and the disk structure must be simplified.

The foregoing objects of the present invention can be attained by forming a magneto-optical recording layer of high corrosion resistance on a disk substrate directly, or through a thin nitride layer, and then successively forming a dielectric layer as an optical effect-enhancing layer and a metallic layer as a reflective layer thereon to form a magneto-optical disk. The thus prepared disk has equivalent reliability and characteristics to those of the conventional magneto-optical disk. That is, the Kerr rotational angle $\theta_k$ peculiar to the magneto-optical recording layer increases and the reflectivity is correspondingly lowered.

According to the present invention, formation of an underlayer requiring substantial process time can be omitted. The production efficiency can thus be increased considerably, since the magneto-optical recording layer having a higher corrosion resistance is provided in the present invention. The higher corrosion resistance can be given to the magneto-optical recording material by adding 0.5 to 15 at. % of either or both of at least one element selected from Cr, Ti, Ta, Nb and Al and at least Pt, Pd, Rh and Au to the alloy of rare earth element and the iron group element. The afore-mentioned materials can be used as such, irrespective of disk structures.

DETAILED DESCRIPTION OF THE PREFERRED EMBODIMENTS

Figure 1:
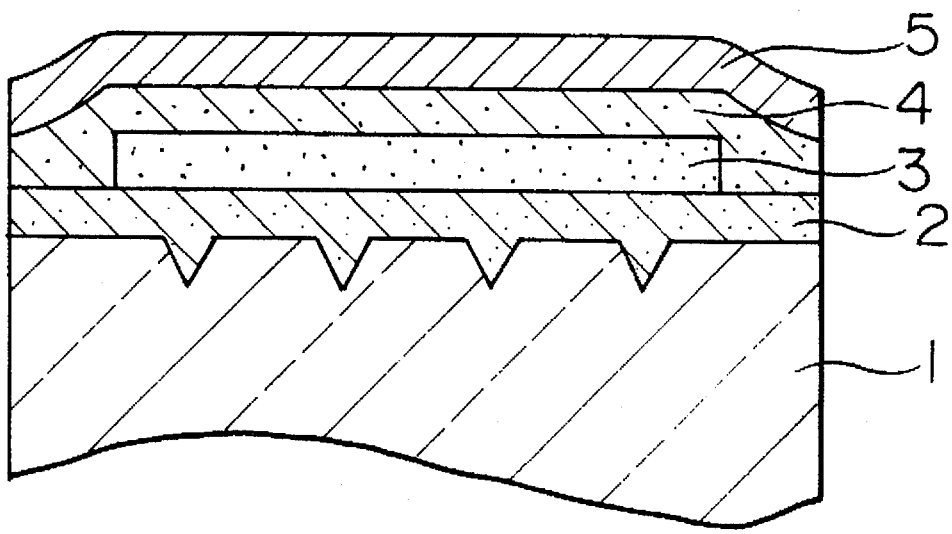
FIGS. 1, 11, 13, 15 and 20 are schematic views showing cross-sectional structures of magneto-optical disks.

When a magneto-optical disk has a four-layer structure comprising a first dielectric layer, a magneto-optical recording layer, a second dielectric layer and a metallic layer, laid successively on a disk substrate, as already described above, heat can readily be dissipated, and the dissipating heat is diffused in the direction parallel to the substrate. Therefore, broad magnetic domains can be formed without excessive elevation of the temperature of the magneto-optical recording layer. Furthermore, the state of the heat flow can be freely changed by controlling the thermal diffusivity and the thickness of the metallic layer. Still furthermore, the thickness of the magneto-optical recording layer, and thus any desired recording/erasing sensitivities to the magneto-optical disk, can be selected. As a result, the maximum attainable temperature of the magneto-optical recording layer can be controlled as described and the structural relaxation of the amorphous magneto-optical recording layer can be suppressed. Thus, a decrease in the reproduction output due to repetitions of recording/erasing can be eliminated.

When the track offset is taken into consideration, an erasing domain having a domain width larger than the recording domain width is required. To this end, a higher erasing laser power than the recording laser power is required, and in that case the only problem is the maximum attainable temperature of the magneto-optical recording layer. However, in the case of the afore-mentioned four-layer structure there is no such problem, since the temperature distribution of the magneto-optical recording layer can be selected as desired by the presence of the metallic layer as a fourth layer.

In the magneto-optical recording of a magneto-optical recording medium of the four-layer structure by field modulation recording, the magneto-optical recording layer is irradiated with a continuous (DC) beam to elevate the temperature of the magneto-optical recording layer. In the magneto-optical recording layer for use in the magneto-optical recording, the coercive force $H_c$ decreases with increasing temperature in the writing temperature range. Thus, there is a temperature $T_W$ at which $H_c$ is less than the sum total of the external magnetic field intensity Hext and the leakage magnetic field intensity $H_D$ generated by the magnetization of the magneto-optical recording layer itself, and the direction of magnetization is in accordance to the direction of modulation field, when the temperature T is above the temperature $T_W$. That is, there is a temperature $T_W$, where $H_c=|Hext+H_D|$. In the region where $T>T_W$, the magnetization of the magneto-optical recording layer occurs in the direction of modulation field, irrespective of information written beforehand. When T is lowered from the region where $T>T_W$ and reaches the $T_W$ region where $H_c=|Hext+H_D|$, the direction of magnetization is immediately set to the direction of the applied modulation field with Hext. Thus the recording domain obtained by field modulation recording reflects an isotherm of $T=T_W$ to give an arrow feature shape. The length of the tail parts at the arrow feather shape depends on the shape of spot part at the right half in the isotherm of $T=T_W$. The shape of the isotherm at that part shows a change in the temperature of the magneto-optical recording layer after the passage of the light beam spot. Thus, when the temperature-decreasing rate of the magneto-optical recording layer is very low, the isotherm takes a shape extended long in the diameter direction of the disk. Thus, the temperature-decreasing rate of the magneto-optical recording layer can be changed, and also the shape of magnetic domains can be controlled by controlling the thermal diffusivity of the magneto-optical recording medium on the whole. Particularly, by increasing the thermal diffusivity of the magneto-optical recording medium to facilitate heat release, the temperature-decreasing rate of the magneto-optical recording layer can be accelerated so that the shape of the isotherm of $T=T_W$ approaches a true circle. That is, the tail length of the arrow feather shape of recording domain can be made smaller.

The procedure and principle of increasing the thermal diffusivity of the magneto-optical recording medium will be described in detail below.

According to one of the procedures for increasing the thermal diffusivity of the magneto-optical recording medium, a metallic layer of high thermal diffusivity is used in the disk structure. By controlling the thermal diffusivity of the metallic layer itself, the tails of the arrow feather-shaped recording domains can be shortened. By providing a dielectric layer between the metallic layer and the magneto-optical recording layer, and changing the thickness or the thermal diffusivity of the dielectric layer, the heat flow from the magneto-optical recording layer to the metallic layer can be controlled, and thus the shape of the recording domains can be controlled. By making the thickness of the dielectric layer smaller, the heat flow from the magneto-optical recording layer to the metallic layer can be increased, therefore, the thermal diffusion through the metallic layer can be increased and the tails of the recording domains in turn shortened.

In order to makes the thermal diffusion through the metallic layer dominant or not to lower the recording sensitivity, it is necessary to make the thickness of the magneto-optical recording layer smaller to lower the thermal capacity thereof. Thus, the thickness of the magneto-optical recording layer must be made smaller.

The condition for making the thermal diffusion by the metallic layer dominant is that the product (multiplied value) of the thermal diffusivity and the thickness of the metallic layer is larger than the product of the thermal diffusivity and the thickness of the magneto-optical recording layer.

In order to increase the thermal diffusivity of the magnetic-optical recording medium on the whole by the metallic layer, it is preferred that the thermal diffusivity of the metallic layer itself be lower than that of the magneto-optical recording layer.

Furthermore, in order to control the heat flow from the magneto-optical recording layer to the metallic layer by the dielectric layer, it is preferred that the thermal diffusivity of the dielectric layer be lower than that of the magneto-optical recording layer.

The condition for passing the heat from the magneto-optical recording layer to the metallic layer through the dielectric layer is the satisfaction the following relationship:

$$\frac{D}{v} > \frac{4l_D^2}{K_D},$$

because the heat generated by a light beam spot must go to the dielectric layer and come back before the light beam spot passes over, where the left side of the foregoing formula represents the time required for the passage of a light beam spot having a diameter of D, the right side represents the time required for the heat transmission through the dielectric layer having a thickness of $l_D$, and $K_D$ is the thermal diffusivity of the dielectric layer and v is the relative speed of the light beam to the magneto-optical recording medium.

In order to effectively utilize the laser beam to increase the temperature of the magneto-optical recording layer, a metallic layer having a higher reflectivity is preferable. The light beam passed through the magneto-optical recording layer is reflected on the metallic layer and is effectively absorbed in the magneto-optical recording layer. This is important also for an increase in the Kerr rotational angle and the quantity of reflected light beam upon reproduction. The reflectivity of the metallic layer is preferably 80% or higher, particularly for obtaining better recording/reproduction characteristics.

The thermal diffusivity of the metallic layer can be controlled by adding a metal having a relatively low thermal diffusivity to a metal having a relatively high reflectivity.

As materials for the metallic layer, such materials having a high reflectivity as Al, Au, Ag, Cu, Pt, Rh, etc. are used and the thermal diffusivity of the metallic layer is controlled preferably by adding at least one of such metals having a low thermal diffusivity as Nb, Ti, Ta, Cr, Ni, Mn and Zr, and these additional elements have an action to increase the corrosion resistance of the metallic layer.

The dielectric layer is preferably made of one of AlN, $SiN_x$, $ZrO_x$, $SiO_x$, $TaO_x$ and ZnS or two or more thereof in mixture in view of the thermal diffusivity, corrosion resistance and optical characteristics. In the case using two or more thereof, not only double compounds such as oxide-nitrides having direct bonds between the metal and the oxygen and nitrogen, but also a mere mixture can be used.

In a magneto-optical disk of four-layer structure comprising a first dielectric layer, a magneto-optical recording layer, a second dielectric layer and a metallic layer, laid successively on a disk substrate provided with guide tracks, on the other hand, the disk characteristics, particularly S/N (signal/noise) ratio can be increased, and a higher reliability and a longer duration can be obtained by allocating the Kerr enhancement action by multiple interference effect to the second dielectric layer and also allocating a mainly protective action to the first dielectric layer without endowing it with a substantial optical effect. The reason is that a larger difference in the refractive index and a higher Kerr enhancement action can be obtained by sandwiching the second dielectric layer between the magneto-optical recording layer and the metallic layer. Thus, in the magneto-optical disk of this structure, a higher effect can be obtained when the refractive index of the second dielectric layer is as approximate to unity (1) as possible.

On the other hand, as one effect of the magneto-optical disk having such a structure as to allocate the Kerr enhancement action to the second dielectric layer, that is, a magneto-optical disk of three-layer structure comprising a magneto-optical recording layer, a second dielectric layer as an optical effect-increasing layer and a metallic layer, laid successively on a disk substrate having guide tracks, the disk structure can be simplified by endowing the Kerr enhancement action to the second dielectric layer as an optical effect-increasing layer, sandwiched between the magneto-optical recording layer and the metallic layer, without lowering the reproduction output, such as S/N, etc. of the disk, as already described before.

In the four-layer structure magneto-optical disk structure, there is an underlayer between the substrate and the magneto-optical recording layer. The step of forming an underlayer requires a majority of the process time preparing the magneto-optical disk. In the three-layer structure, such a step can be omitted, and thus the production time can be largely shortened and the disk cost lowered. An equivalent or superior reliability to that of the four-layer structure magneto-optical disk can be obtained by making the corrosion resistance of the magneto-optical recording layer higher and subjecting the boundary surface of the magneto-optical recording layer to a nitriding treatment, etc. Furthermore, the disk characteristics can be made equivalent or superior to those of the four-layer structure magneto-optical disk by optimizing the layer structure and composition (thickness and physical properties).

The boundary surface of the magneto-optical recording layer can be nitrided by deposition of the layer by sputtering etc in a $N_2$-containing atmosphere By controlling the atmosphere, the magneto-optical recording layer having a corrosion resistance can be obtained simply. It is satisfactory that the nitrided layer has a thickness of 50 to 100 Å. When the magneto-optical recording layer having the nitrided layer is formed directly on a plastic substrate such as a polycarbonate substrate, the adhesion between the substrate and the magneto-optical recording layer is effectively increased. For example, a magneto-optical disk of such a simple structure consisting only of a magneto-optical recording layer having the nitrided layer on both boundary surfaces, formed on a plastic substrate could be obtained, where C/N ratio was 50 dB when recording was carried out with the most dense pattern at a position 30 mm in radius from the center of the 5.25" disk (number of revolutions: 1,800 rpm). In that case, care must be paid to the occurrence of structural relaxation of the magneto-optical recording layer unless the recording or erasing laser power is controlled, as already described before. The disk characteristics can be further improved by making the thickness of the magneto-optical recording layer a thickness through which the light beam can pass, forming a metallic layer acting as both of a light reflecting layer and a thermal diffusion layer on the opposite side of the magneto-optical recording layer and endowing the Kerr effect and Faraday effect and also the Kerr enhancement action to the magneto-optical recording layer, whereby the structural relaxation of the magneto-optical recording layer can be suppressed and the disk reliability can be improved. This is because the metallic layer has a high corrosion resistance and thus acts as a protective layer.

In the foregoing description, amorphous alloys of a rare earth element and an iron group element have been explained as materials for the magneto-optical recording layer. The effects of the present invention do not depend on the species of materials, and a magneto-optical recording layer made of alternately laminated layers of noble metal elements such as Pt, Pd or Rh and iron group elements can be also used. As the structure of the magneto-optical recording layer, a double layer structure such as $(Pt/Co)_n$/TbFeCo or Nd(Tb)FeCo/TbFeCo or multiple layer structures of three or more layers can also be used. In that case, the double layer structure or multiple layer structure has an effect on the suppression not only of structural relaxation of the amorphous magneto-optical recording layer, but also of diffusion between the layers. The so called exchange couple layer, where magneto-optical recording layers of different species are magnetically coupled to one another, has an effect on the suppression of changes in the exchange coupling force. This is because the effect depends not on the structure or materials of magneto-optical recording layer, but on the structure of the magneto-optical recording medium on the whole.

The present invention will be described in detail below, referring to Examples and drawings.

EXAMPLE 1

The schematic view showing the cross-sectional structure of a magneto-optical disk prepared according to the present invention is given in FIG. 1.

The disk was prepared in the following manner. On a disk substrate 1 having guide tracks, a first dielectric layer 2 of silicon nitride was at first formed by sputtering. Sintered $Si_3N_4$ target was used and an $Ar/N_2$ mixed gas (mixing ratio in partial pressure: 80:10) was used as a sputtering gas. The sputtering conditions were a sputtering gas pressure of $1\times10^{-2}$ Torr and a discharge RF power density of 4.2 W/cm². The first dielectric layer 2 had a thickness of 850 Å.

Then, a $Tb_{23}Fe_{62}Co_{12}Nb_3$ magneto-optical recording layer 3 was formed thereon by sputtering. The target was an alloy of the above-mentioned composition and the sputtering gas was a pure Ar gas. The sputtering conditions were a sputtering gas pressure of $5\times10^{-3}$ Torr and a discharge RF powder density of 4.2 W/cm². The magneto-optical recording layer thus formed had a thickness of 300 Å.

Then, a second silicon nitride dielectric layer 4 was formed thereon by sputtering. The sputtering gas was Ar and a sintered silicon nitride target was used. The sputtering conditions were the same as those used in the formation of the first dielectric layer except that the sputtering gas pressure was changed to $2\times10^{-2}$ Torr.

Finally, a metallic $Al_{90}Ti_{10}$ layer 5 was formed thereon by sputtering. A target of Al-Ti alloy having the above-mentioned composition and an Ar sputtering gas were used. The sputtering conditions were a sputtering gas pressure of $1\times10^{-2}$ Torr and a discharge RF powder density of 4.2 W/cm², and the metallic layer thus formed had a thickness of 500 Å.

As a comparative example, a magneto-optical recording disk consisting of a first dielectric layer 2, 850 Å in thickness, a magneto-optical recording layers 3, 800 Å in thickness and a second dielectric layer 4, 1,500 Å in thickness, formed successively on the same substrate as above was prepared under the same conditions by the same procedure.

Figure 2:
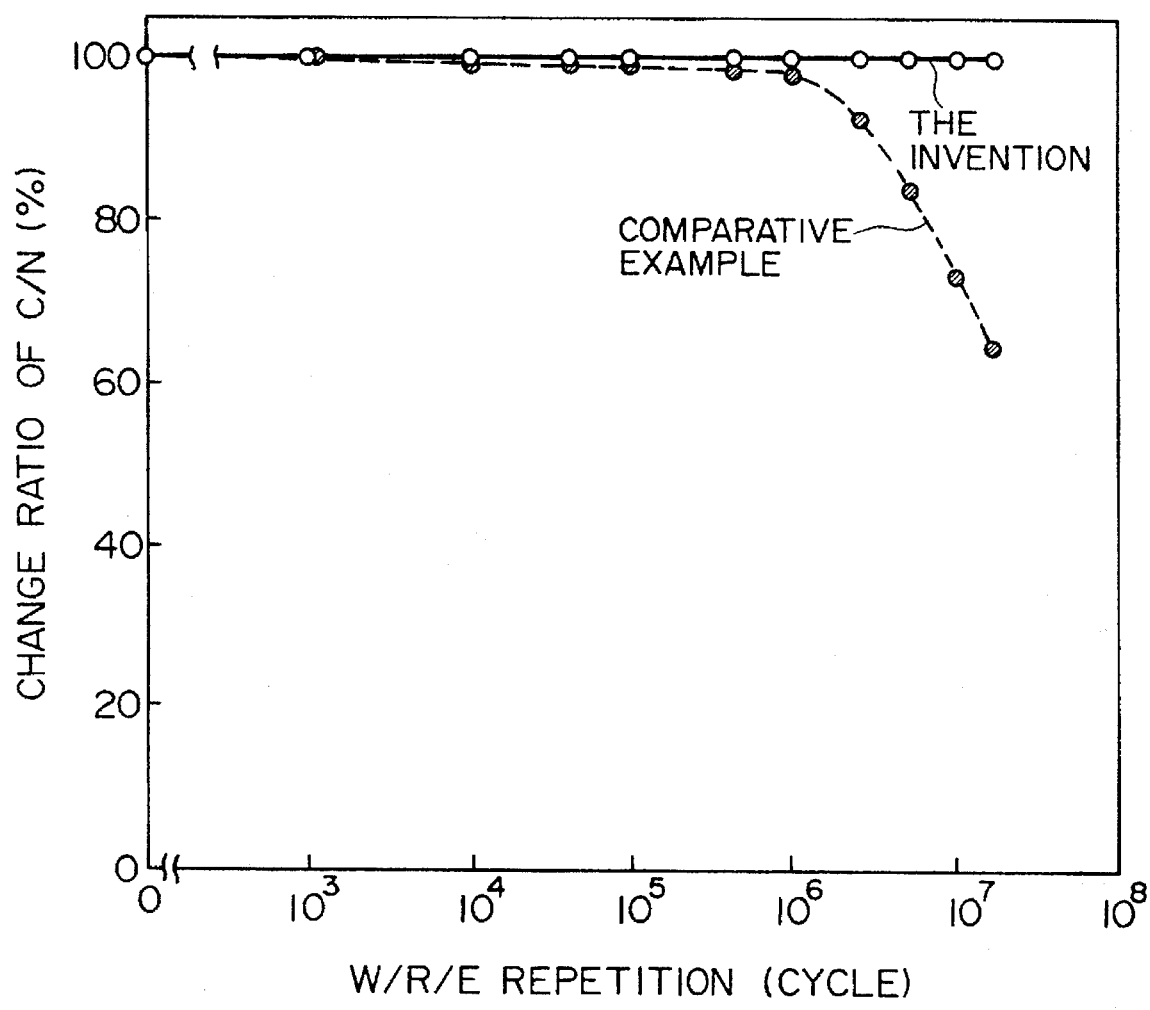
FIGS. 2, 4, 5, 7 and 9 show changes in the represented signal output when recording/reproduction/erasing (W/R/E) are repeated.

The thus prepared magneto-optical disks were subjected to recording/reproduction/erasing at the position of innermost periphery r of 30 mm in radius from the disk center with the recording frequency f of 4.9 MHz, the number of disk revolutions of 2,400 rpm, the recording layer power of 6 mW for the present disk and 7 mW for the disk of Comparative Example for the reasons as described below, the erasing layer power of 7 mW for the present disk and 9 mW for the disk of Comparative Example for the same reason and the reproducing layer power of 1.2 mW. The results of the investigations of relationship between the recording/reproduction/erasing (W/R/E) repetitions (cycles) and the change ratio of reproduction output (C/N %) (initial=100) are shown in FIG. 2. In the case of the disk of the present invention there is no change at all in the reproduction output even if $2\times10^7$ repetitions are made, whereas in the case of the Comparative Example, decrease in the reproduction output starts at $10^4$ repetitions and becomes suddenly considerable after $10^6$ repetitions, and the reproduction output is decreased to 65% of the initial at $2\times10^7$ repetitions. The conditions for recording and erasing of the disk of the Comparative Example were the conditions for obtaining the same magnetic domain width as formed by writing on the disk under the conditions of the present disk, that is, the recording laser power of 7 mw and the erasing power of 9 mW. The effects of the present invention depend not on the materials of the magneto-optical recording layer and the first and second dielectric layers, but only on the disk structure.

When the reproduction of the present disk was compared with the disk of the Comparative Example, the reproduction output was 62 dB in the case of the present disk and 56 dB in the case of comparative disk, and thus the reproduction output of the present disk was higher by about 6 dB than that of comparative disk. This is because the present disk of the above-mentioned structure had the reflectivity R of 22% and the Kerr rotational angle $\theta_k$ (including Faraday rotational angle) of 0.890, whereas the comparative disk had R of 23% and $\theta_k$ of 0.59°. In other words, the present disk had only a largely increased Kerr rotational angle without any substantial decrease in the reflectivity, as compared with the comparative disk.

In this Example the reproducing laser power was set to constant 1.2 mW. When changes in the reproduced signal output were investigated with changing reproducing power when the recording was carried out under the constant conditions, breakage of recorded data took place at 3.2 mW in the case of the present disk of four-layer structure, whereas the breakage of recorded data took place at 2.3 mW in the case of the Comparative disk. In other words, it was found that the margin to the reproducing laser power was small in the case of the Comparative disk. This is also because of the effect by the presence of the metallic layer 5.

Furthermore, the erasing characteristics of the disks were investigated. In the recording under the foregoing conditions, the recording domain size was 0.8 µm. When such a recording domain was erased, an erasing domain width of 0.8 µm was not enough, since there was a track offset on the disk drive and thus the value was deviated from the laser beam center by about 0.2 µm. To completely erase the 0.8 µm - wide recording domain, the erasing domain width of 1.3 µm was required. To this end, the present disk required an erasing laser powder of 7 mW, whereas the comparative disk required a considerably large erasing laser power, that is, 9 mW.

This led to a decrease in the reproduced signal powder due to repetitions of recording/erasing, as mentioned above. In specific, the structural relaxation of amorphous magneto-optical recording layer took place, resulting in a decrease in the energy of perpendicular magnetization anisotropy iKu.

EXAMPLE 2

A magneto-optical disk having the same schematic cross-sectional structure as shown in FIG. 1 was prepared by the same procedure as in Example 1. Materials and sputtering conditions used in this Example are summarized in Table 1.

TABLE 1

| | | | Sputtering conditions | | |
|---|---|---|---|---|---|
| Structure | Material | Thickness | Pressure | Sputtering gas | Discharge RF power |
| First dielectric layer 2 | AlN | 850 Å | $1 \times 10^{-2}$ Torr | Ar | 4.2 W/cm² |
| Magneto-optical recording layer 3 | GdTbFeCoNb | 300 Å | $5 \times 10^{-2}$ Torr | Ar | 4.2 W/cm² |
| Second dielectric layer 4 | AlN | 200 Å | $2 \times 10^{-2}$ Torr | Ar | 4.2 W/cm² |
| Metallic layer 5 | $Al_{1-x}Cr_x$* | 500 Å | $1 \times 10^{-2}$ Torr | Ar | 4.2 W/cm² |

Remark:
*: Cr concentration x was changed to 0, 0.05, 0.1, 0.2 and 0.3.

Figure 3:
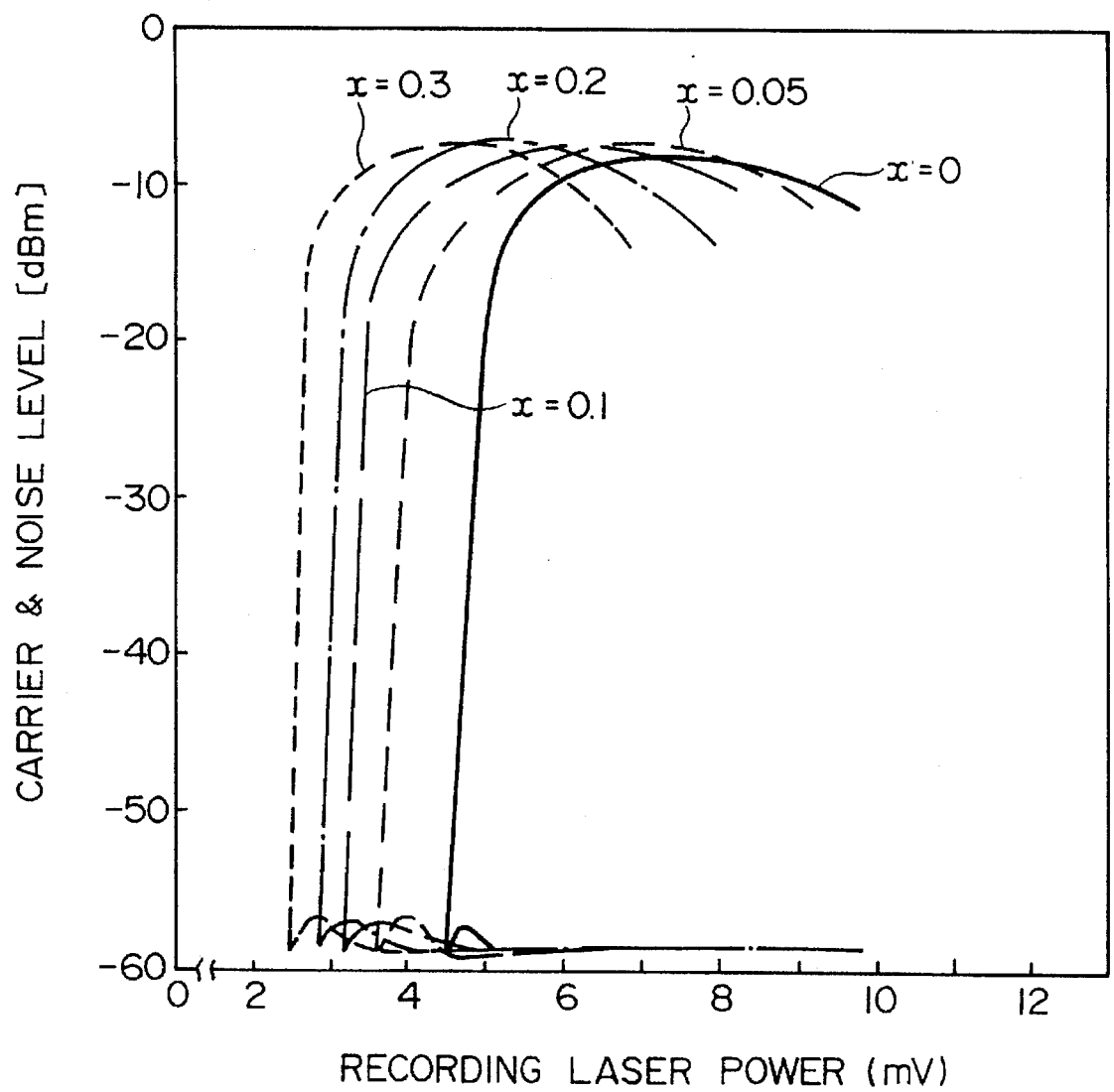
FIGS. 3, 6, 10, 17 and 21 show the dependence of reproduced signal output on recording laser power.

The disk thus prepared was initially subjected to a determination of its dependence of the reproduction output on the recording laser power. The results are shown in FIG. 3. The conditions for the determination were as follows:
Number of disk revolution: 2,400 rpm
Disk position: 30 mm in radius from the disk center
Applied external magnetic field intensity: 400 Oe
Opening ratio of lens $N_A$: 0.55
Recording frequency: 4.9 MHz It was found that when the metallic layer 5 contains only 5 at. % Cr in Al, the minimum recording laser power was abruptly lowered by about 1 mW, and then slowly changed with increasing Cr concentration. Therefore, it can be seen that the thermal diffusivity is abruptly lowered by adding a small amount of Cr to Al and then slowly changed with increasing Cr concentration. The recording power for obtaining a maximum C/N was shifted toward the higher power side with increasing Cr concentration, but the C/N ratio was almost constant 50 dB. Thus, any desired recording sensitivity and erasing sensitivity were obtained by controlling the thermal diffusivity of the metallic layer 5 by changing the Cr concentration of the metallic layer, and the matching to the disk drive could be readily obtained. Similar effects could be obtained by changing only the thickness of the metallic layer 5 without changing the composition of the metallic layer. This was because the heat was dissipated in a different way, as clarified by solving the thermal diffusion equation.

Figure 4:
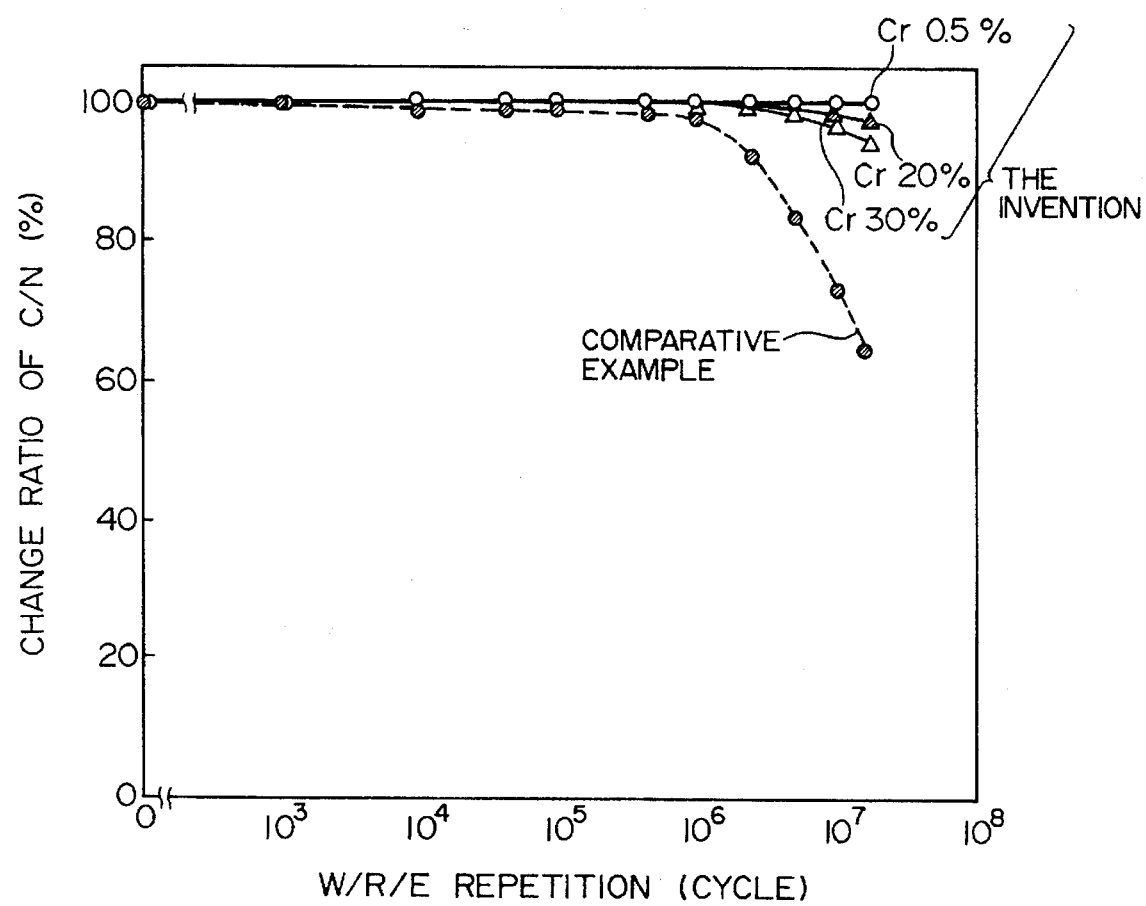

Then, changes in the reproduced signal output were investigated when the recording/reproduction/erasing (W/R/E) were repeated, and the results are shown in FIG. 4. The Comparative Example used here was the same comparative magneto-optical disk as used in Example 1. The conditions and the procedure for the determination were the same as in Example 1. It can be seen from FIG. 4 that no change is observed in the reproduction output of the present disk at a Cr concentration of not more than 10 at. % even after $2 \times 10^7$ W/R/E repetitions, but at Cr concentrations of 20 at. % and 30 at. %, the reproduction outputs were a little decreased, i.e. 3% and 6%, respectively, after $2 \times 10^7$ repetitions. The changes in the reproduction output could be controlled by stabilizing the crystal structure of the magneto-optical recording layer.

In the case of disks having a high sensitivity, for example, disks capable of recording with a laser power approximate to the laser power of reading laser beam, there is a possibility to cause the data breakage at the reading, and thus care must be paid to this fact.

When $Al_{1-x}Co_x$, $Al_{1-x}Ti_x$, $Al_{1-x}Ta_x$, $Al_{1-x}Nb_x$, $Al_{1-x}Ni_x$, $Al_{1-x}Zr_x$, $Al_{1-x}Mn_x$, $Cu_{1-x}Co_x$, $Cu_{1-x}Ti_x$, $Cu_{1-x}Ta_x$, $Cu_{1-x}Nb_x$, $Cu_{1-x}Cr_x$, $Cu_{1-x}Ni_x$, $Cu_{1-x}Zr_x$, $Cu_{1-x}Mn_x$, $Rh_{1-x}Co_x$, $Rh_{1-x}To_x$, $Rh_{1-x}Ta_x$, $Rh_{1-x}Nb_x$, $Rh_{1-x}Cr_x$, $Rh_{1-x}Ni_x$, $Rh_{1-x}Zr_x$, $Rh_{1-x}Mn_x$, $Pb_{1-x}Co_x$, $Pb_{1-x}Ti_x$, $Pb_{1-x}Ta_x$, $Pb_{1-x}Nb_x$, $Pb_{1-x}Cr_x$, $Pb_{1-x}Ni_x$, $Pb_{1-x}Zr_x$, $Pb_{1-x}Mn_x$, $Au_{1-x}Co_x$, $Au_{1-x}Ti_x$, $Au_{1-x}Ta_x$, $Au_{1-x}Nb_x$, $Au_{1-x}Cr_x$, $Au_{1-x}Ni_x$, $Au_{1-x}Zr_x$, $Au_{1-x}Mn_x$, $Pt_{1-x}Co_x$, $Pt_{1-x}Ti_x$, $Pt_{1-x}Ta_x$, $PT_{1-x}Nb_x$, $Pt_{1-x}Cr_x$, $Pt_{1-x}Ni_x$, or $Pt_{1-x}Zr_x$ was used for the metallic layer 5 in place of $Al_{1-x}Cr_x$ in Table 1, similar effects to those shown in FIG. 4 were obtained.

When some of Al was replaced with Au, Pt, Rh, Pd or Cu or some of Cr was replaced with Co, Ti, Ta, Nb, Ni, Zr or Mn in $Al_{1-x}Cr_x$, similar effects were obtained.

EXAMPLE 3

A magneto-optical disk having a schematic cross-sectional structure shown in FIG. 1 was prepared in the same procedure as in Example 1. Materials and sputtering conditions are summarized in Table 2.

TABLE 2

| Structure | Material | Thickness | Sputtering conditions | | |
|---|---|---|---|---|---|
| | | | Pressure | Sputtering gas | Discharge RF power |
| First dielectric layer 2 | SiO | 850 Å | $1 \times 10^{-2}$ Torr | Ar | 4.2 W/cm² |
| Magneto-optical recording layer 3 | $(Tb_{0.6}Nd_{0.4})_{24}Fe_{60}Co_{16}$ | 300 Å | $5 \times 10^{-2}$ Torr | Ar | 4.2 W/cm² |
| Second dielectric layer 4 | ZnS | 200 Å | $2 \times 10^{-2}$ Torr | Ar | 2.1 W/cm² |
| Metallic layer 5 | Pt/Ni (Concentration gradient) | 500 Å | $1 \times 10^{-2}$ Torr | Ar | DC Sputter |

The metallic layer 5 consisted of a 200 Å-thick pure nickel layer, a 150 Å-thick Pt-Ni layer, where Pt-Ni concentration was linearly changed, and a 150 Å-thick pure Ni layer. The concentration gradient Pt-Ni layer was prepared by sputtering of simple substance targets of Pt and Ni while controlling the DC sputter power to the respective targets.

Figure 5:
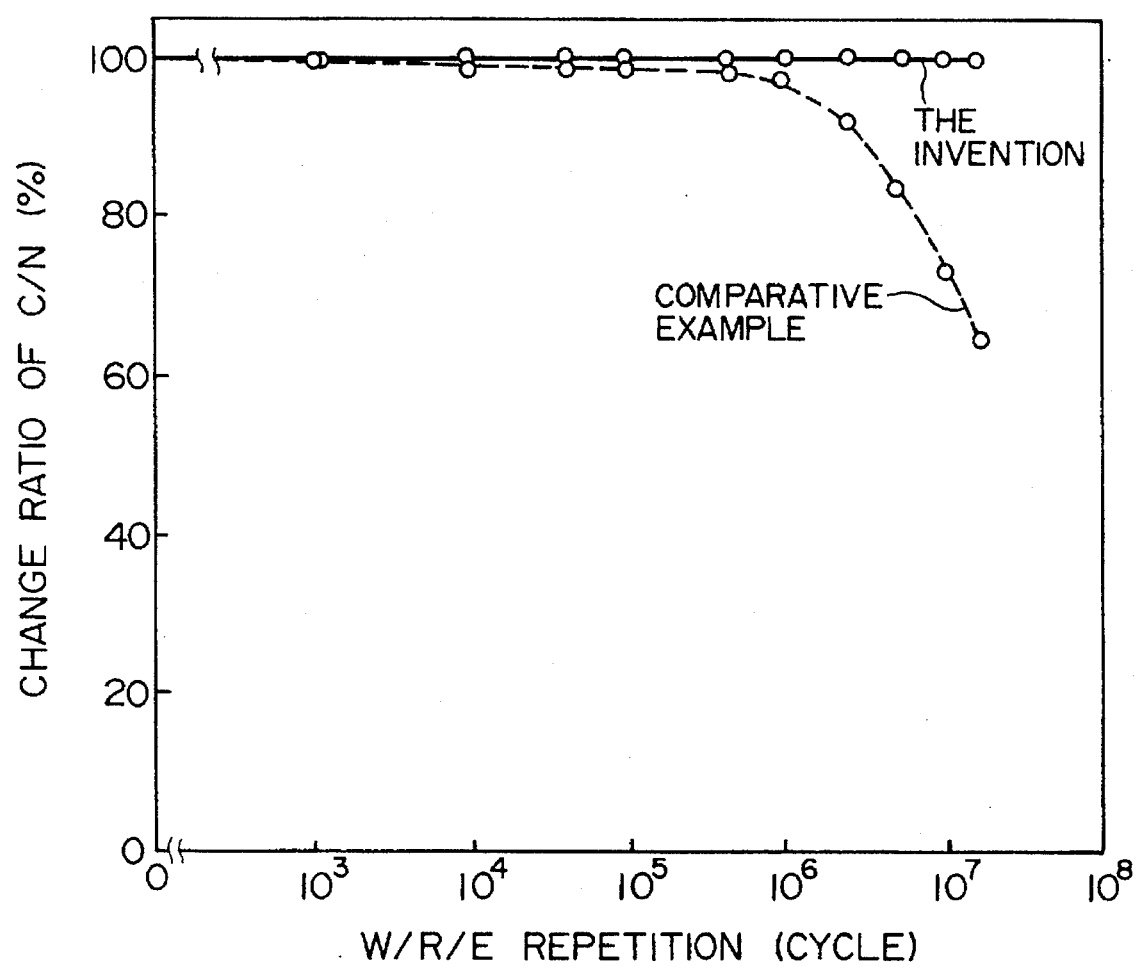

Changes in the reproduced signal output were investigated when the thus prepared disk was subjected to repetitions of recording/reproduction/erasing (W/R/E), and the results are shown in FIG. 5. The Comparative Example used was the same comparative magneto-optical disk as used in Example 1 and was investigated under the same conditions and in the same procedure as in Example 1.

It can be seen from FIG. 5 that no decrease was observed in the reproduction output of the present disk even after $2 \times 10^7$ W/R/E repetitions.

Figure 6:
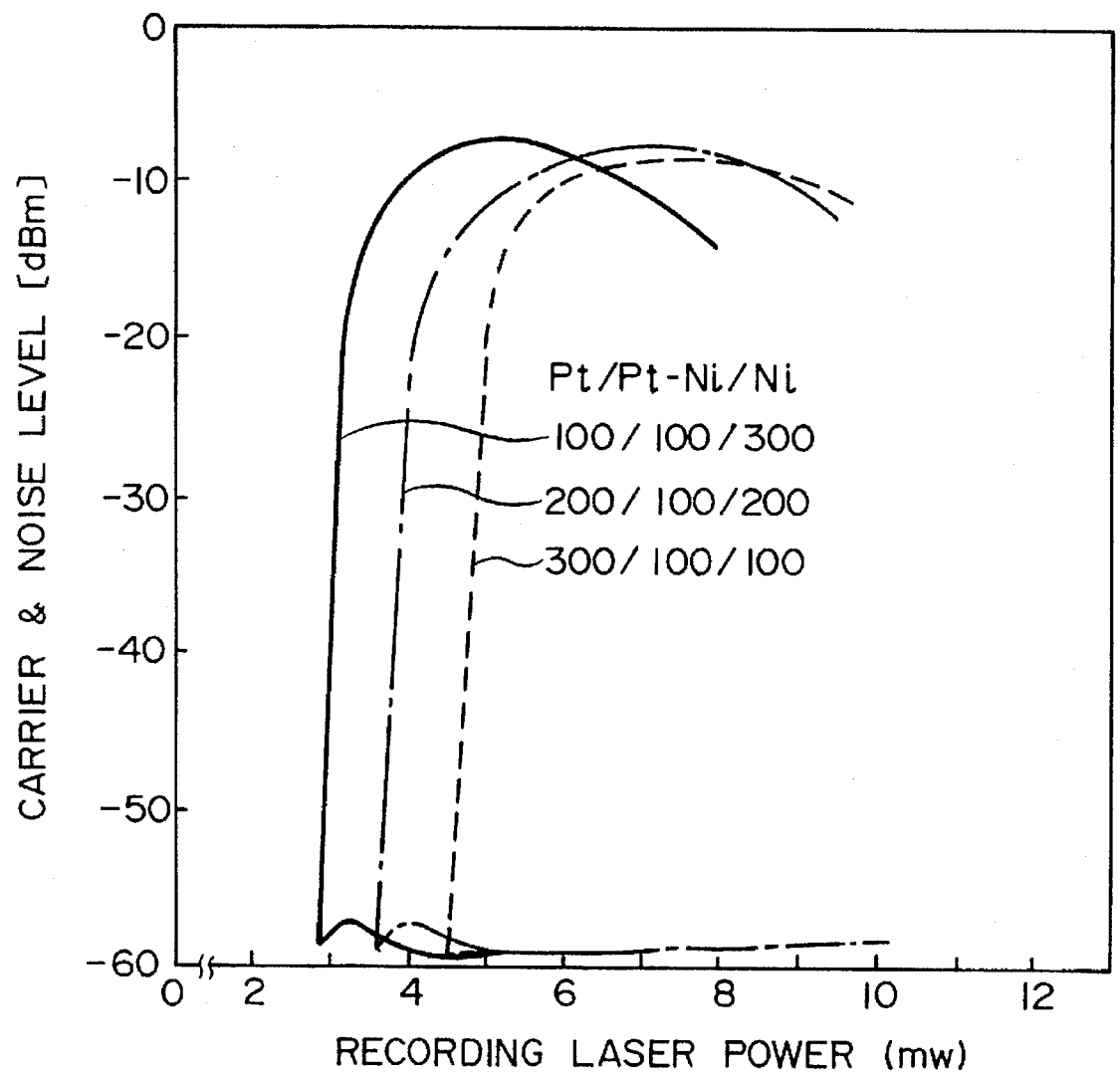

By changing the thickness of the Pt layer and the Ni layer in the structure of the metallic layer 5, i.e. Pt/Pt-Ni/Ni, to 100/100/300, 200/100/200 and 300/100/100 in Å units, the recording and erasing sensitivities could be changed. The dependence of the reproduction power on the recording laser power is shown in FIG. 6, from which it can be seen that the minimum recording laser power decreases with decreasing thickness of the Pt layer (or with increasing thickness of the Ni layer) and the recording and erasing sensitivities of the disk can be improved.

Finally, Pt-Ni layer in Pt/Pt-Ni/Ni was set to $Pt_{80}Ni_{20}$ without any concentration gradient, and Kerr rotational angle $\theta_k$ was measured, and it was found to be 0.94° in the case of the concentration gradient Pt-Ni layer and 0.86° in the case of set $Pt_{80}Ni_{20}$ layer. Thus there was a difference of about 0.08° in the Kerr rotational angle therebetween. Furthermore, the reflectivity R was found to be 95% in the case of the former and 87% in the case of the latter. Thus, there was a difference of about 8% in the reflectivity therebetween. The corrosion resistance could be also obtained by the presence of a concentration gradient in the Pt-Ni layer while keeping the high reflectivity. As a result, a high reflectivity and a high Kerr rotational angle were obtained. The signal/noise ratio (C/N) was also found to be 56 dB in the case of the former and 53 dB in the case of the latter and thus there was a such large difference as about 3 dB in the C/N ratio therebetween. A magneto-optical disk with a high reflectivity, a high corrosion resistance and a high C/N ratio could be obtained.

Figure 8:
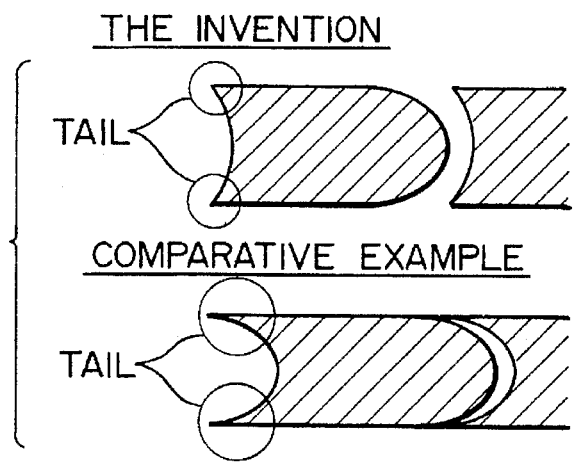
FIG. 8 shows the shape of a recording domain formed when recording is carried out by field modulation recording.

Similar results to those shown in FIG. 5 were obtained when Al/Co, Al/Ti, Al/Ta, Al/Nb, Al/Cr, Al/Ni, Al/Zr, Al/Mn, Cu/Co, Cu/Ti, Cu/Ta, Cu/Nb, Cu/Cr, Cu/Ni, Cu/Zr, Cu/Mn, Rh/Co, Rh/Ti, Rh/Ta, Rh/Nb, Rh/Cr, Rh/Ni, Rh/Zr, Rh/Mn, Pd/Co, Pd/Ti, Pd/Ta, Pd/Nb, Pd/Cr, Pd/Ni, Pd/Zr, Pd/Mn, Au/Co, Au/Ti, Au/Ta, Au/Nb, Au/Cr, Au/Ni, Au/Zr, Au/Mn, Pt/Co, Pt/Ti, Pt/Ta, Pt/Nb, Pt/Cr, Pt/Ni, Pt/Zr or The recording domains obtained by the field modulation recording were investigated by a polarizing microscope, and the results of observation are schematically shown in FIG. 8. The magneto-optical disk of the structure of the present invention had shortened tails of the domain as shown by circles in FIG. 8, which were useful for the high density recording. In the present magneto-optical disk, the C/N ratio was 62 dB, whereas in the comparative disk it was 57 dB, which was by about 5 dB smaller. This is because the tails in the domains were eliminated in the present disk and the resolving power was increased thereby. Therefore, the recording could be made at smaller bit pitches. In other words, a high density recording could be carried out. Furthermore, the recording and reproduction could be effectively made with a laser beam of shorter wavelength.

EXAMPLE 5

A magneto-optical disk having a schematic cross-sectional structure shown in FIG. 1, prepared in the same procedure as in Example 1 was used. Materials and sputtering conditions are summarized in Table 3.

TABLE 3

| | | | Sputtering conditions | | |
|---|---|---|---|---|---|
| Structure | Material | Thickness | Pressure | Sputtering gas | Discharge RF power |
| First dielectric layer 2 | $SiN_x$ | 850 Å | $1 \times 10^{-2}$ Torr | $Ar/N_2 = 80/20$ (partial pressure) | 4.2 W/cm² |
| Magneto-optical recording layer 3 | $Tb_{24}Fe_{61}Co_{12}Nb_3$ | 300 Å | $5 \times 10^{-3}$ Torr | Ar | 4.2 W/cm² |
| Second dielectric layer 4 | SiN | 200 Å | $2 \times 10^{-2}$ Torr | Ar | 4.2 W/cm² |
| Metallic layer 5 | $Al_{85}Ti_{15}$ | 500 A | $1 \times 10^{-2}$ Torr | Ar | 4.2 W/cm² |

Pt/Mn was used as the materials to the metallic layer in place of Pt/Ni in Table 2.

Similar results were obtained when some of the Pt was replaced with Al, Cu, Rh, Pd or Au or some of the Ni was replaced with Co, Ti, Ta, Nb, Cr, Zr or Mn in the Pt/Ni.

EXAMPLE 4

Figure 7:
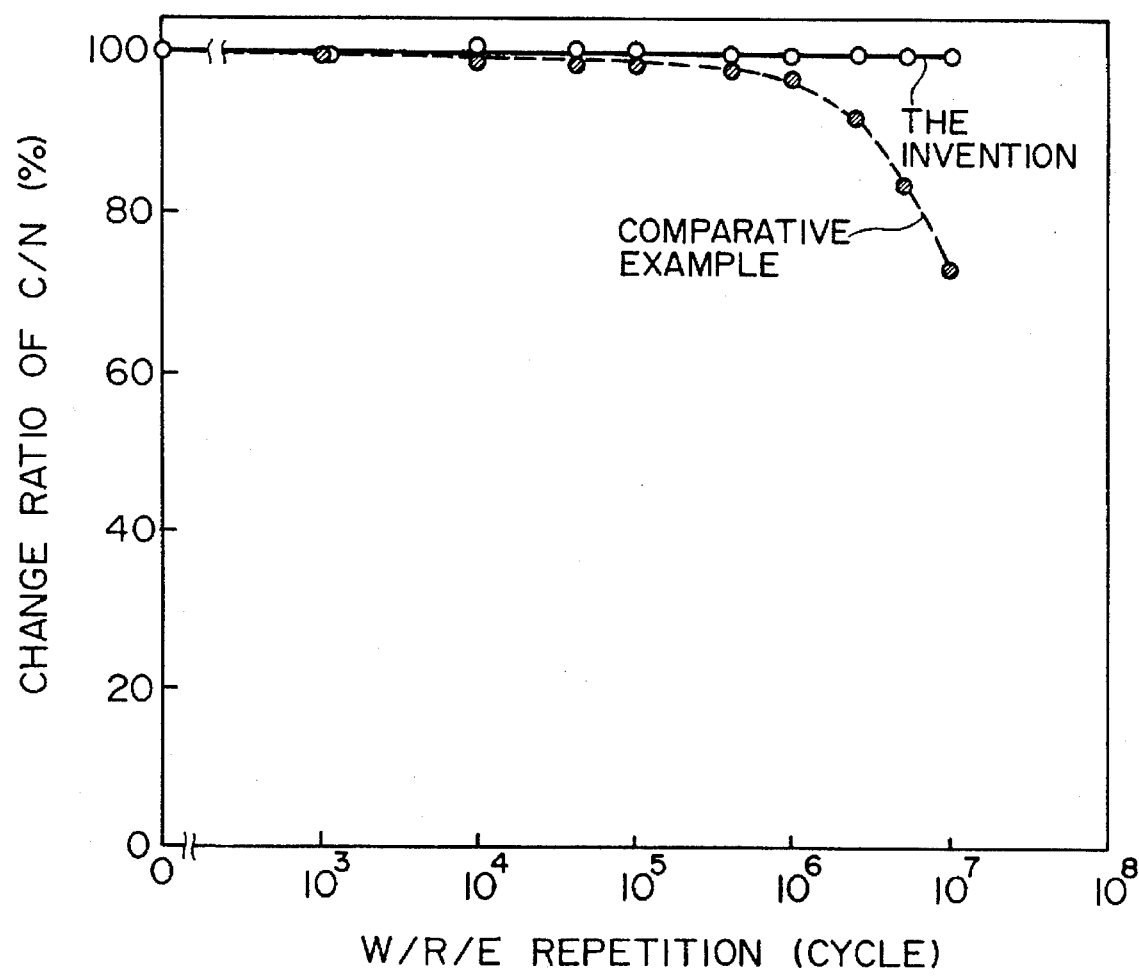

A magneto-optical disk having the same structure as in Example 1 was used in this example, except that the surface was overcoated with a UV resin having a low water absorbability. The disk was subjected to repetitions of recording/reproduction/erasing (W/R/E) by field modulation recording. The results are shown in FIG. 7. No change was observed in the reproduction output even after $1 \times 10^7$ repetitions.

The Comparative Example used here was the same comparative disk as used in Example 1 except that the surface was overcoated with the same UV resin as above.

The conditions for the determination are as follows:
Laser power: 6 mW (continuous beam)
Number of disk revolution: 2,400 rpm
Recording frequency f: 5.0 MHz
Switching magnetic field: ±300 Oe
Band width: 30 kHz Thus, the decrease in the reproduction output by repetitions of W/R/E could be suppressed, and the effects were due to the disk structure, irrespective of the recording system.

Figure 9:
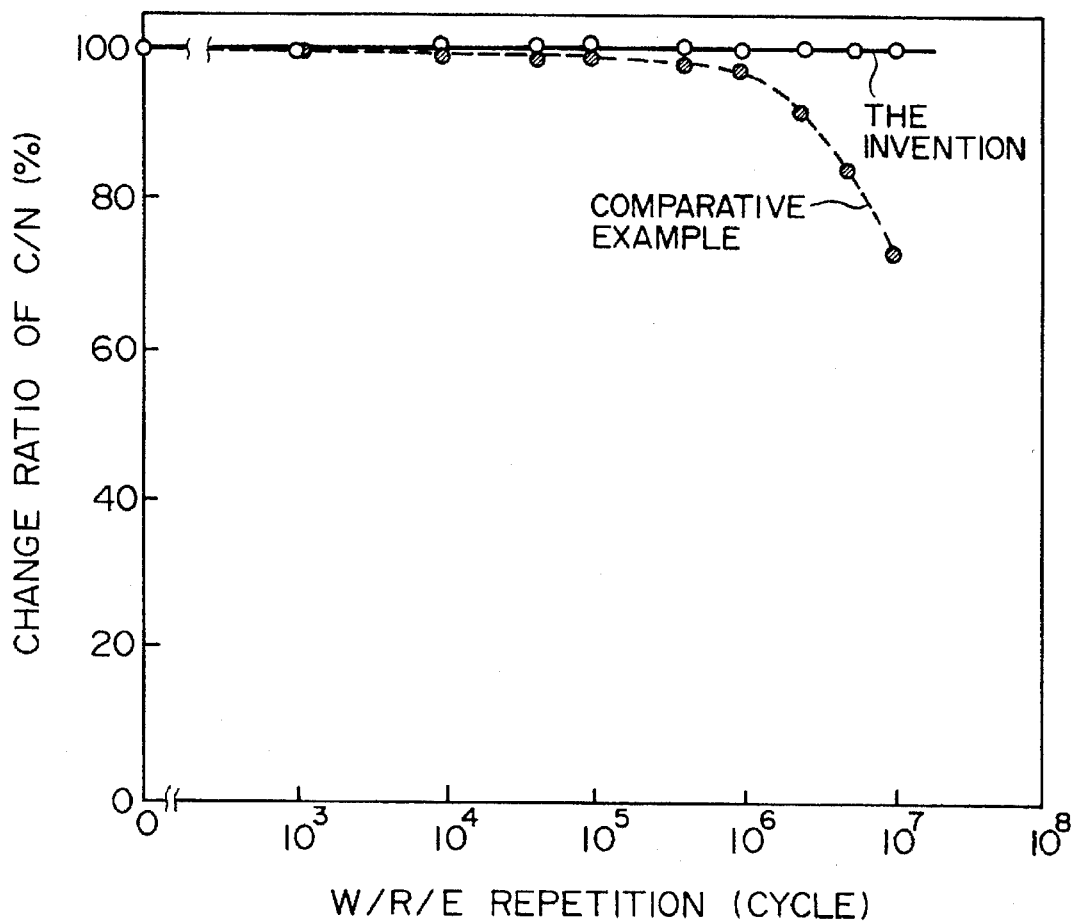

The refractive index $n_1$ of the first dielectric layer was 2.05 and the refractive index $n_2$ of the second dielectric layer was 2.15, where it was necessary that $n_2 \geq n_1$. The disk was subjected to recording/reproduction/erasing (W/R/E) repetitions to investigate changes in the reproduced signal outputs. The results are shown in FIG. 9. The Comparative Example used here was the same comparative magneto-optical disk as used in Example 1 and was subjected to the investigation under the same conditions and the procedure as in Example 1. It can be seen from FIG. 9 that no decrease was observed in the reproduction output of the present magneto-optical disk even after $1 \times 10^7$ W/R/E or more repetitions, whereas a decrease by 70% was observed from the initial reproduction output of the comparative magneto-optical disk after $10^7$ W/R/E repetitions. As already described before, the decrease in the reproduction output by W/R/E repetitions could be much suppressed by controlling the temperature distribution of the magneto-optical recording medium of four-layer structure as in the present magneto-optical disk.

Furthermore, $\theta_k$ was 0.76° in the case of the present magneto-optical disk, whereas that of the comparative disk was 0.55°. Thus, the four-layer structure of the present magneto-optical disk largely contributed to an increase in the Kerr rotational angle, and thus to a higher C/N ratio. The results of the measurements supported this fact. In specific C/N ratio of the present disk was 51 dB, whereas that of the comparative disk was 45 dB, and thus the C/N ratio of the present disk was by about 7 dB higher.

Figure 10:
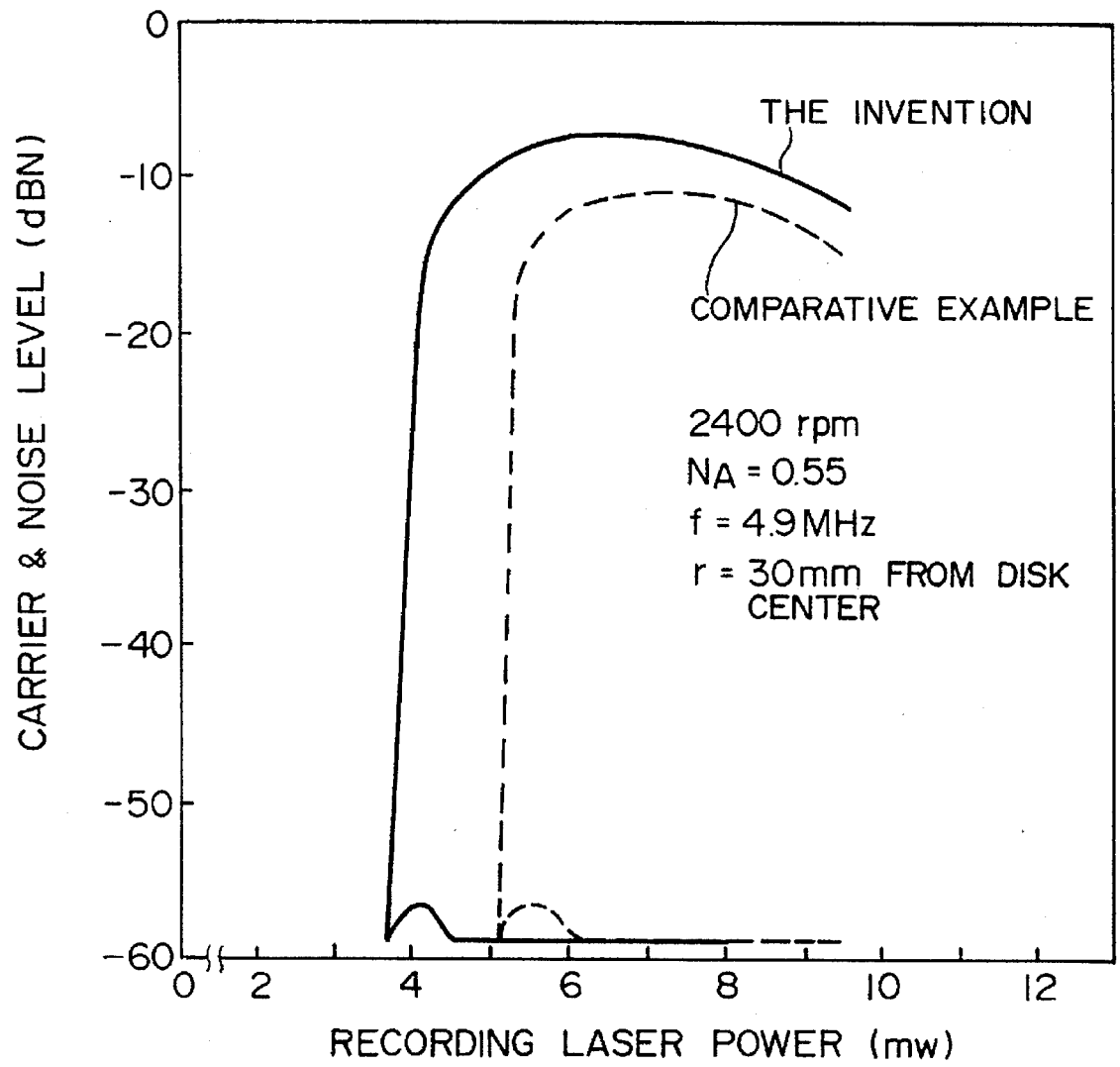

FIG. 10 shows the dependences of the reproduced output on the laser power of the present disk and the comparative disk, respectively. Furthermore, the recording sensitivity could be controlled by controlling the Ti concentration in the Al-Ti system of metallic layer 5. That is, the higher the Ti concentration, the higher the recording sensitivity of the magneto-optical disk. When the thickness of the metallic layer was made smaller, the similar effect was also obtained, but when the reproducing laser power approaches the minimum recording power, there is a possibility to cause data breakage by the reproducing beam. Thus, care must be paid to this fact. The Ti concentration is a result of fine adjustment in view of the matching to the disk drive as well as the care to the aforementioned fact.

EXAMPLE 6

A transparent glass substrate 1 provided with guide tracks for tracking was placed in a RF magnetron sputtering vacuum chamber and the chamber was evacuated to less than $8 \times 10^{-7}$ Torr. Then, a gas mixture of Ar and $N_2$ was introduced into the chamber and $SiN_x$ was deposited as a dielectric layer 2 to a thickness of 850 Å on the substrate 1 by sputtering a sintered $Si_3N_4$ target under a gas pressure of $1 \times 10^{-2}$ Torr. $SiN_x$ had a thermal diffusivity of $2 \times 10^{-2}$ W/cm·deg. and a refractive index of 2.0. The thickness of 850 Å was determined in view of the condition for Kerr effect enhancement. Then, after the similar evacuation of the chamber, an Ar gas was introduced into the chamber and a TbTeCoNb magneto-optical recording layer 3 was deposited thereon to a thickness of 200 Å by sputtering an TbFeCoNb alloy target under a gas pressure of $5 \times 10^{-3}$ Torr. The magneto-optical recording layer 3 had a thermal diffusivity of 0.13 W/cm·deg.

Then, after the similar evacuation of the chamber, an Ar gas was introduced into the chamber, and a $SiN_x$ layer was deposited thereon to a thickness of 500 Å as a dielectric layer 4 by sputtering a sintered $Si_3N_4$ target under a gas pressure of $2 \times 10^{-2}$ Torr. The $SiN_x$ layer had a thermal diffusivity of 0.01 W/cm·deg and a refractive index of 2.2.

Figure 11:
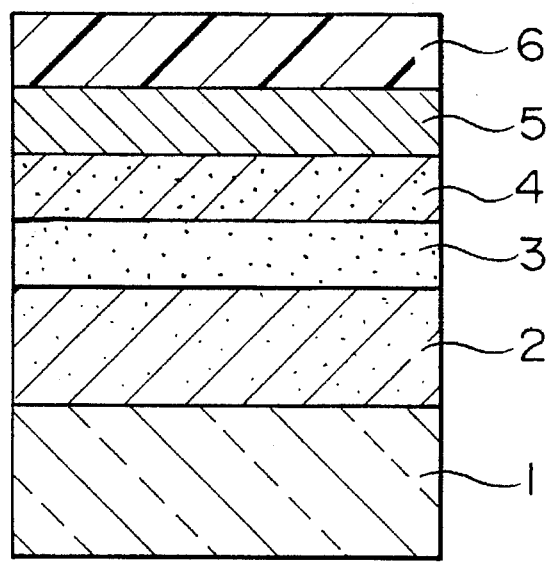

Then, after the similar evacuation of the chamber, an Ar gas was introduced into the chamber and an Al layer was deposited thereon to a thickness of 500 Å as a metallic layer by sputtering an Al target under a gas pressure of $3 \times 10^{-3}$ Torr. The Al layer had a thermal diffusivity of 0.9 W/cm·deg. Then, the thus layer-deposited substrate was taken out of the vacuum chamber and spin coated with an ultraviolet-curing resin (UV resin) only to a thickness of 10 µm as an overcoat layer 6 and cured by exposure to ultraviolet rays in vacuum for one minute, as shown in FIG. 11. A UV resin having a pencil hardness of 4H or higher and a small internal stress after the curing was found to be suitable for the overcoat layer 6.

Figure 12:
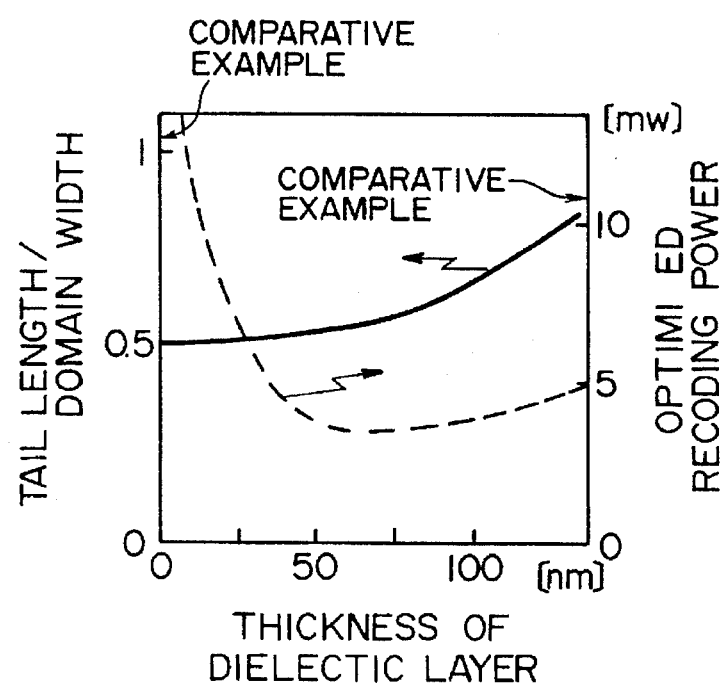
FIG. 12 shows the dependence of optimized recording power and tail length/domain width of an arrow feather-type magnetic domain on the thickness of a second dielectric layer.

The thus prepared magneto-optical recording medium was subjected to field modulation recording by applying a modulation field of ±200 Oe while irradiating the medium with a DC beam (wavelength: 830 nm) through a lens ($N_A$: 0.6). The linear speed of the medium was 20 m/s. The recording domains thus formed were inspected with a polarizing microscope to obtain the relationship between the domain width, recording power and tail length. The measurements were carried out while changing the thickness of the dielectric layer 4. The results are shown in FIG. 12. The optimized recording power was a power that makes the domain width 1.1 µm. As compared with Comparative Examples as shown in FIG. 12, both optimized recording power and tail length were lower and shorter, respectively. The tail length was at its shortest with a thickness of about 50 nm of the dielectric layer 4, and the optimized recording power was the lowest with a thickness of 50 to 70 nm of the dielectric layer 4. Thus, the most suitable thickness of the dielectric layer 4 was about 50 nm. The tail length could be thus controlled by controlling the thickness of the dielectric layer 4.

In the field modulation recording of the magneto-optical recording medium of the present structure, a C/N ratio of 50 dB was obtained at a domain length of 0.75 µm.

EXAMPLE 7

Figure 13:
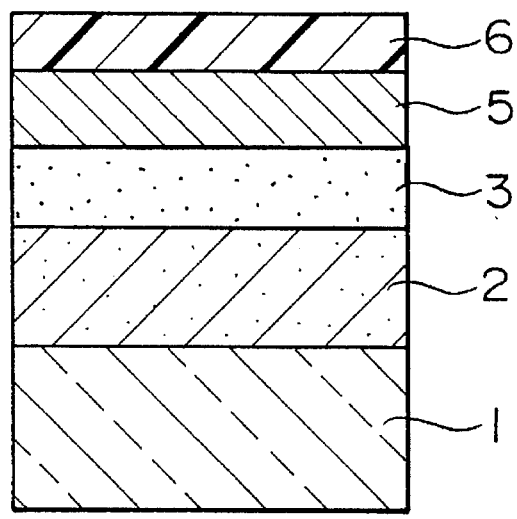

A magneto-optical recording medium of such a structure that the dielectric layer 4 was omitted from the structure of Example 6 was prepared in the same manner as in Example 6. The structure is schematically shown in FIG. 13.

Figure 14:
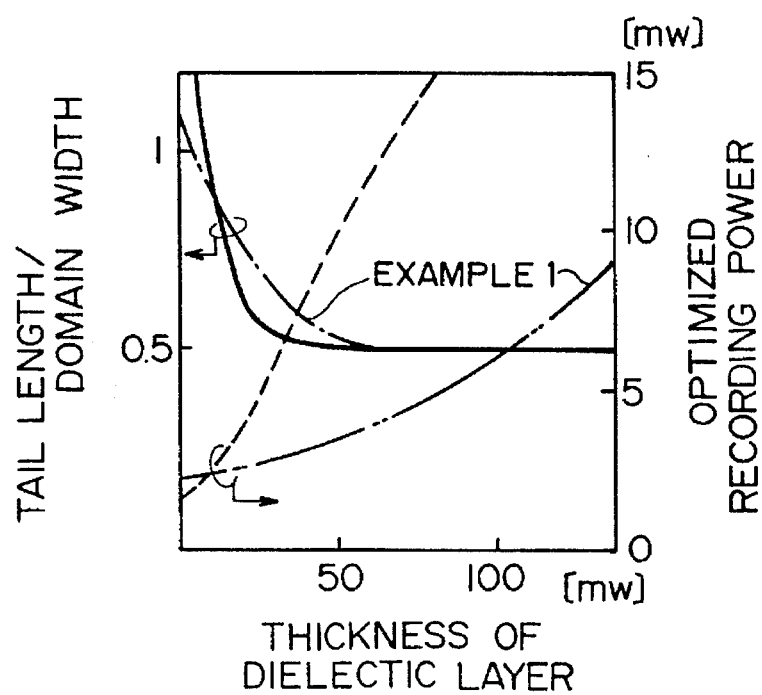
FIG. 14 shows the dependence of optimized recording power and tail length/domain width of an arrow feather-type magnetic domain on the thickness of a metallic layer.

Relationship between the tail length and the optimized recording power when the thickness of the metallic layer 5 of the magneto-optical recording medium is shown in FIG. 14.

When the thickness of the metallic layer 5 exceeded 50 nm, the tail length was sufficiently short, but the optimized recording power was largely increased. In Example 6, on the other hand, the dependence on the thickness of the metallic layer 5 was relatively low. In this Example, the production process was simplified owing to one less layer, and the disk was also optically stable. Anyway, it can be seen that the tail length can be controlled by changing the thickness of the metallic layer 5. In this Example, the most suitable thickness of the metallic layer 5 was 40 to 50 nm.

EXAMPLE 8

Figure 15:
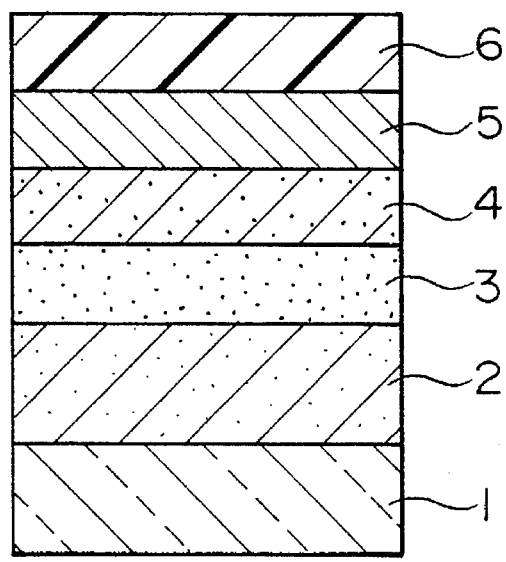
Figure 16:
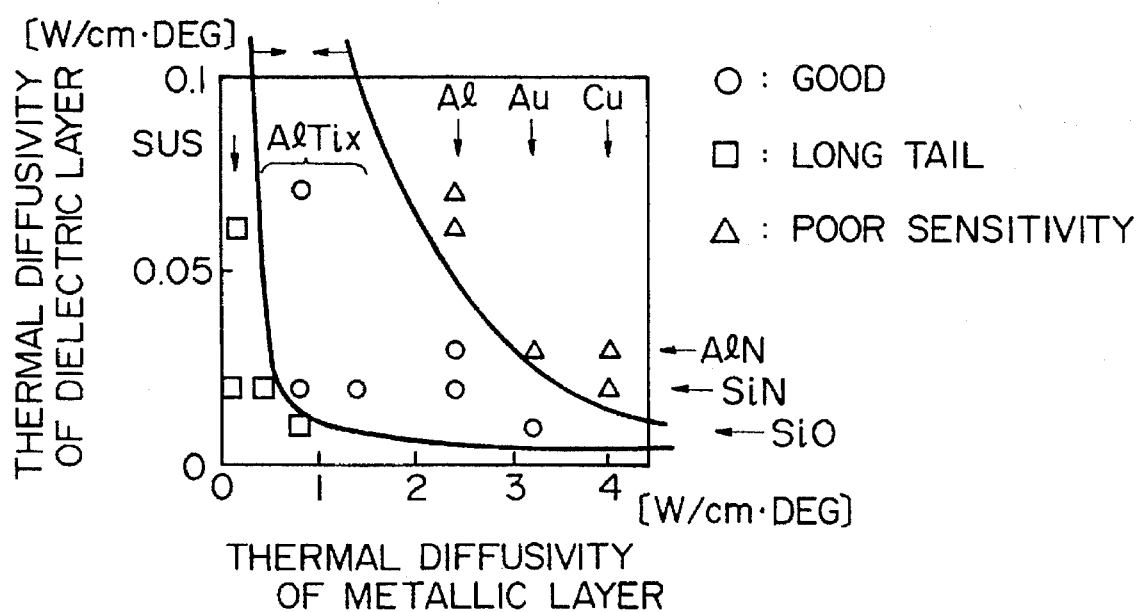
FIG. 16 shows the relationship between the thermal diffusivity of a metallic layer as a fourth layer and the thermal diffusivity of a dielectric layer when the tail length of arrow feather-type magnetic domain is 0.7 times the domain width.

As shown in FIG. 15, $SiN_x$ was deposited as a dielectric layer 2 on a transparent glass substrate 1 provided with guide tracks for tracking in a vacuum chamber after evacuation of the chamber by sputtering with a gas mixture of Ar and $N_2$ under a gas pressure of $1 \times 10^{-2}$ Torr in the same manner as in Example 6. The dielectric layer 2 had a thickness of 850 Å as in Example 6, a thermal diffusivity of 0.13 W/cm·deg and a refractive index of 2.0. Then, after the similar evacuation of the vacuum chamber, an Ar gas was introduced into the chamber and a magneto-optical recording layer 3 was deposited thereon to a thickness of 20 nm by sputtering a TbFeCoNb alloy target under a gas pressure of $5 \times 10^{-3}$ Torr. Then, after the similar evacuation of the chamber, an Ar gas was introduced into the chamber, and a dielectric layer 4 was deposited thereon to a thickness of 50 nm by sputtering one of AlN, SiN, SiO, $TiO_2$ and $ZrO_2$ as targets. Then, after the similar evacuation of the chamber, an Ar gas was introduced into the chamber, and a metallic layer 5 was deposited thereon to a thickness of 50 nm by sputtering one of stainless steel, Al-Ti alloy, Al, Au and Cu as targets under a gas pressure of $3 \times 10^{-3}$ Torr. Then, an ultraviolet ray-curing resin (UV resin) was spin coated thereon to a thickness of 10 µm as an overcoat layer 6, as in Example 6 and cured by exposure to ultraviolet rays in vacuum for one minute.

The thus prepared magneto-optical recording media were subjected to field modulation recording as in Example 6. The results are shown in FIG. 15, where the axis of abscissa shows the thermal diffusivity of the metallic layer 5 and the axis of ordinate shows the thermal diffusivity of the dielectric layer 4 and the marks "○" and "△" show that the tail length is less than 0.7 times the domain width, and the marks "○" and "□" shows that the optimized recording power is less than 10 mW, as mentioned in Example 6.

The tails of the recording domains could be shortened by controlling the thermal diffusivity of the metallic layer 5 and dielectric layer 4, and thus magneto-optical recording media suitable for high density recording could be obtained.

The layer structure of the present magneto-optical recording medium is not restricted to those disclosed in the foregoing Examples and can include the following modifications.

(1) One or a mixture or compound of two or more of AlN, $SiN_x$, $ZrO_x$, $SiO_x$, $TaO_x$, ZnS, $ZnO_x$ and $TiO_x$ can be used as materials for the dielectric layer 4.

(2) At least one of Al, Cu, Ag, Pt, Rh and Pd can be used as a host component for the metallic layer 5.

(3) At least one of elements of Nb, Ti, Ta, Cr, Ni, Mn and Zr can be added to the metallic layer 5.

(4) An X-Y amorphous alloy can be used as materials for the magneto-optical recording layer 3, where X is one or an alloy of two or more of Tb, Dy, Gd, Nd and Pr, and Y is Fe or Co or an alloy thereof.

(5) An element for increasing the corrosion resistance such as Ti, Ta, Cr, V, Pt, etc. can be added to the magneto-optical recording layer 3 besides Nb.

(6) Glass, polycarbonate, polyolefin, acrylic resin, ultraviolet-curing resin, etc. can be used as materials for the disk substrate 1.

(7) Media of such a structure as shown in FIGS. 1, 13 and 14 are bonded to each other so as to face the UV resin layer.

(8) Film of alternately laminated layers of X and layers of Y (thickness of one layer is 5 to 50 Å and thickness of the film is such that the light beam can pass therethrough) can be used as a magneto-optical recording layer 3, where X is Pt, Pd or Rh and Y is Co or Fe or an alloy of Co or Fe with X.

EXAMPLE 9

A magneto-optical disk having a schematic cross-sectional structure shown in FIG. 1 was prepared in the following manner.

A $Si_3N_4$ layer was formed on a disk substrate 1 provided with guide tracks as a first dielectric layer 2 by sputtering a sintered $Si_3N_4$ target in a vacuum chamber with a sputtering gas of Ar and $N_2$ (a mixing ratio of Ar/$N_2$ in partial pressure: 80/20). The sputtering was carried out by evacuating the vacuum chamber to the order of $10^{-7}$ Torr, introducing the sputtering Ar/$N_2$ gas into the chamber and sputtering under a gas pressure of $10^{-2}$ Torr with a discharge RF powder density of 4.2 W/cm² for 10 minutes to form the first dielectric layer to a thickness of 1,300 Å.

Ad materials for the first dielectric layer 2, $SiO_2$, SiO, AlN, $Al_2O_3$, $TiO_2$, $ZrO_2$, ZnS, $Nb_2O_5$, $Cr_2O_3$, $WO_3$, $MoO_3$, $Ta_2O_2$ or any other materials having a high stability could be used.

Then, a $Tb_{23}Fe_{62}Co_{12}Nb_3$ layer was formed by sputtering as a magneto-optical recording layer 3. The target was an alloy of the above-mentioned composition and the sputtering gas was an Ar gas. The sputtering was carried out by evacuating the chamber to the order of $10^{-7}$ introducing the Ar gas into the chamber up to $5 \times 10^{-3}$ Torr and sputtering with a discharge RF powder density of 4.2 W/cm² for 23 minutes, whereby the magneto-optical recording layer 3 having a thickness of 300 Å was formed.

In the foregoing embodiment, TbFeCoNb was used as the material for the magneto-optical recording layer 3, but materials having a perpendicular magnetization anisotropy, such as $(Gd_{0.7}Tb_{0.3})_{24}Fe_{61}Co_{12}Cr_3$, GdDyFeCo, GdHoFeCo, TbNdFeCo, DyNdFeCo, etc. could be used.

Then, a second dielectric layer 4 was deposited thereon by sputtering a sintered $Si_3N_4$ target with a sputtering Ar gas. The sputtering was carried out by evacuating the chamber to the order of $10^{-7}$ introducing the sputtering Ar gas therein up to $2 \times 10^{-2}$ Torr and sputtering with a discharge RF power density of 4.2 W/cm² for 23 minutes, whereby the second dielectric layer 4 having a thickness of 500 Å was formed.

In this connection, the thickness and the refractive index were found important and the effect on the Kerr enhancement was abruptly lowered when any of the foregoing parameters was varied from the optimized conditions. Thus, care must be paid to this fact.

Finally, a metallic layer 5 of Al-Ti (Al: 85 at. % Ti: 15 at. %) was formed thereon by sputtering a Al-Ti alloy target of the above-mentioned composition with a sputtering Ar gas. The sputtering conditions were the same as in the case of forming the first dielectric layer except that the sputtering gas was an Ar gas and the sputtering time was 23 minutes, whereby the metallic layer having a thickness of 500 Å was formed.

The composition of elements in the metallic layer was set to optimum conditions for obtaining a desired recording or erasing sensitivity in view of the matching to the disk drive.

In this Example, the sensitivity could be adjusted by controlling the Ti concentration. For example, the minimum recording power could be made 2.5 mW by adjusting the Ti concentration to 30 at. %.

The thus prepared disk was subjected to determination of disk characteristics. As Comparative Example, a disk having the following structure was used:

Disk substrate/SiN (85 Å)/TbFeCoNb (300 Å)/SiN (200 Å)/Al-Ti (500 Å) was subjected to the determination under the same conditions. In the comparative disk the Kerr enhancement action was endowed to the first dielectric layer.

Figure 17:
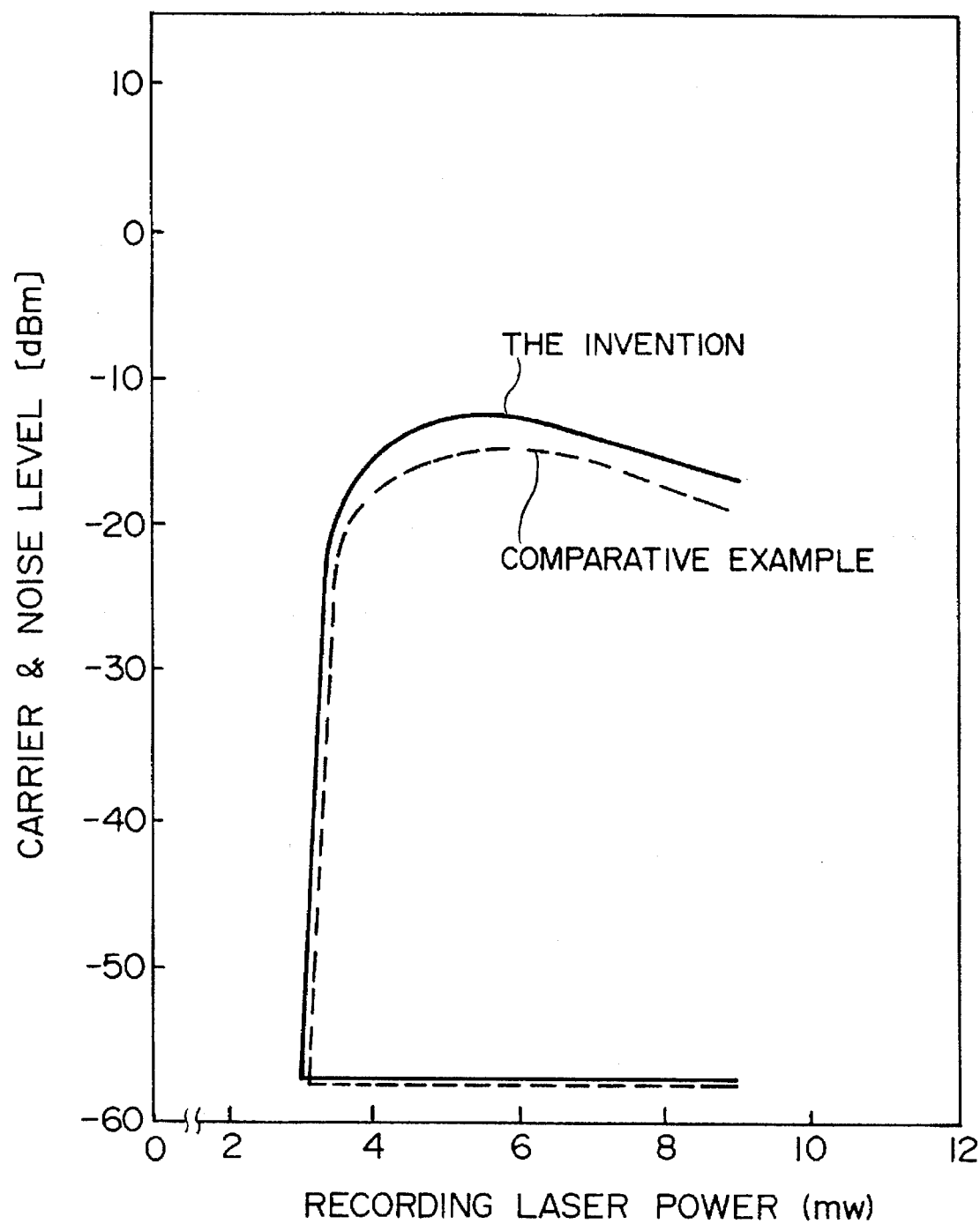

The results are shown in FIG. 17, showing the dependence of carrier level (C) and noise level (N) on the recording laser power. It can be seen from FIG. 17 that there is no large difference in the recording sensitivity between the present disk in which the Kerr enhancement action was endowed to the second dielectric layer and the comparative disk in which the Kerr enhancement action was endowed to the first dielectric layer, and that the recording could be made with about 3 mW.

The C/N ratio of these disks was 53 dB in the case of the present disk, and 47 dB in the case of the comparative disk, and thus the present disk could have a higher C/N ratio by 5 dB. In specific, the Kerr rotational angle $\theta_k$ was 0.86° in the case of the present disk and 0.75° C. in the case of the comparative disk, or the Kerr rotational angle was larger by 0.11° in the case of the present disk. Thus, the Kerr rotational angle enhanced by the second dielectric layer was in a higher ratio than by the first dielectric layer, though the reflectivity R was 21% in both cases.

Then, the reliability test of the present disk and the comparative disk was carried out in the following manner.

Figure 18:
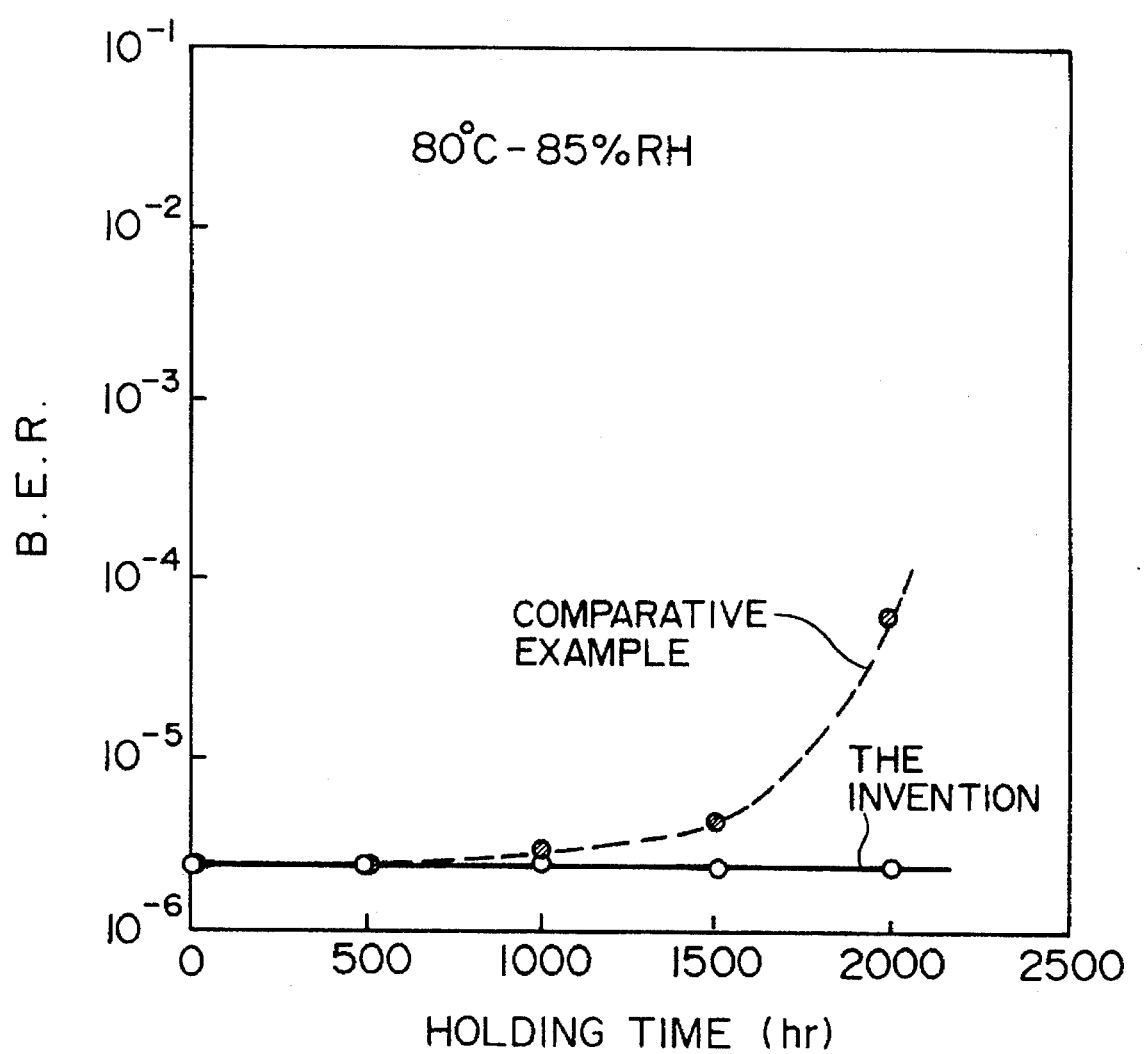
FIGS. 18 and 19 show changes with time in the bit error rate (BER) when the magneto-optical disk is held at 80° C. -85% RH.

The disks were held at 80° - 85% RH and changes with time in the bit error rate (BER) were measured. The results are shown in FIG. 18. It can be seen from FIG. 18 that no increase in BER was observed in the present disk in which the Kerr enhancement action was endowed to the second dielectric layer, even after holding in the aforementioned atmosphere for 2,000 hours, whereas in the comparative disk in which the Kerr enhancement action was endowed to the first dielectric layer an increase in BER slowly appeared 1,000 hours after holding and reached 15 - fold 2,000 hours thereafter. Thus, the magneto-optical disk with a high reliability and a long duration could be obtained by endowing the Kerr enhancement action to the second dielectric layer and endowing a protective action to the first dielectric layer without lowering the disk characteristics.

EXAMPLE 10

A magneto-optical disk having a schematic cross-sectional structure shown in FIG. 1 was prepared in the same procedure as in Example 9.

The structure of the disk and the sputtering conditions are shown in Table 4.

TABLE 4

| Structure | Material | Thickness | Sputtering conditions | | |
|---|---|---|---|---|---|
| | | | Sputtering gas pressure | Sputter-ing gas | Discharge RF power |
| First di-electric layer 2 | $Al_2O_3$ | 1500 Å | $1 \times 10^{-2}$ Torr | $Ar/O_2$ in partial pressure (95/5) | 4.2 W/cm$^2$ |
| Magneto-optical recording layer 3 | $(Tb_{0.6}Nd_{0.4})_{25}Fe_{60}Co_{15}$ | 300 Å | $5 \times 10^{-2}$ Torr | Ar | 4.2 W/cm$^2$ |
| Second di-electric layer 4 | $Si_3N_4$ | 500 Å | $2 \times 10^{-2}$ Torr | Ar | 4.2 W/cm$^2$ |
| Metallic layer 5 | $Al_{0.9}Pt_{0.1}$ | 500 Å | $1 \times 10^{-2}$ Torr | Ar | 4.2 W/cm$^2$ |

The thus prepared disk was subjected to a determination of its C/N ratio. The present disk had a C/N ratio of 52 dB (recording period: 1.5 T, number of disk revolution: 2,400 rpm, lens opening ratio $N_A$: 0.55, recording frequency: 4.93 MHz), which was by 5 dB higher than 47 dB of the comparative disk used in Example 9, in which the Kerr enhancement action was endowed to the first dielectric layer, because the Kerr rotational angle of the present disk was by 0.11° higher.

Figure 19:
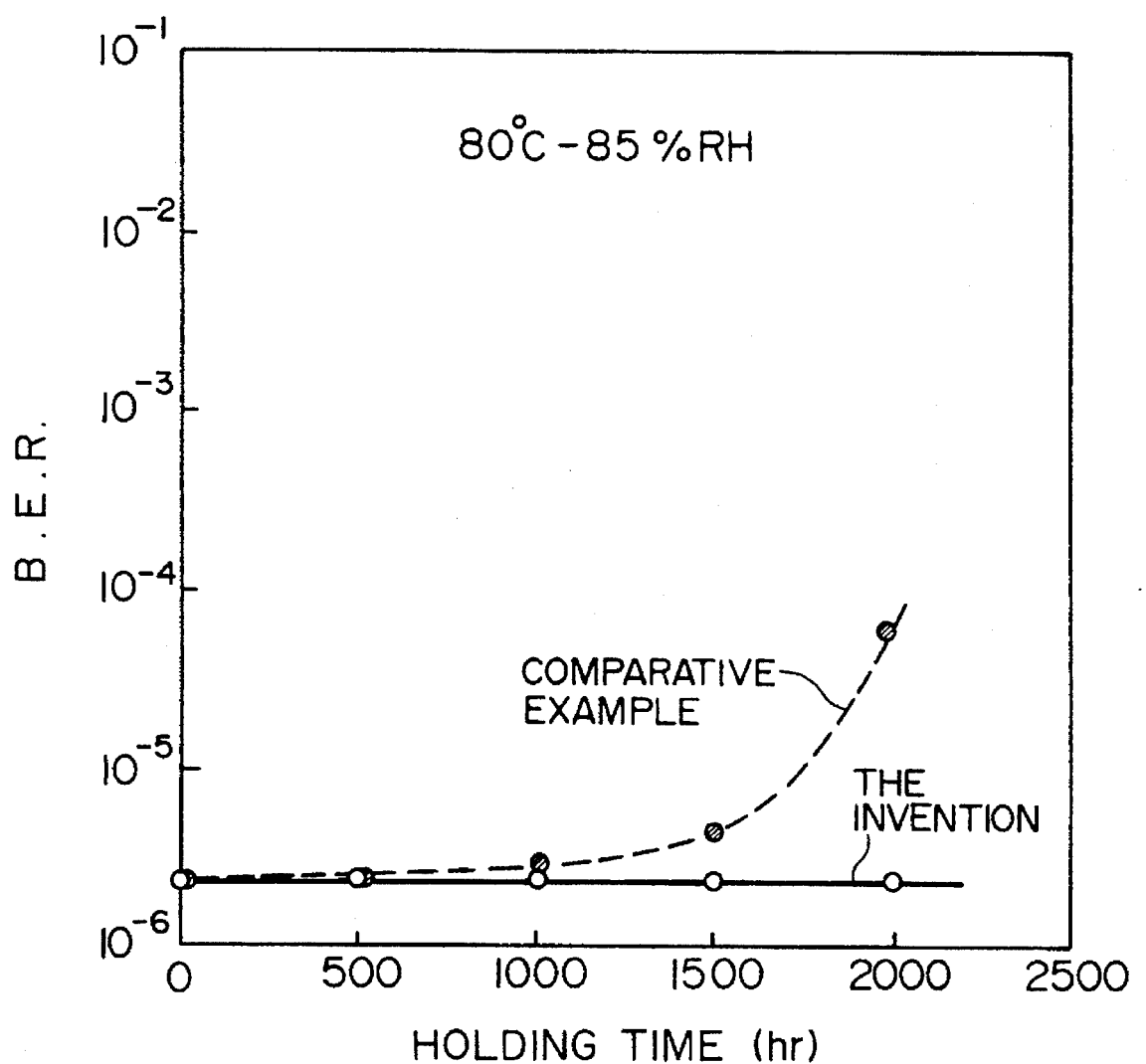

The reliability test of the present disk was carried out by holding it at 80° - 85% RH to measure changes in BER with time. The results are shown in FIG. 19. In the present disk, no substantial change was observed in BER 2,000 hours after holding at 80° C. - 85% RH, whereas BER of the comparative disk shown in Example 9 was increased to about 15-fold.

EXAMPLE 11

A magneto-optical disk having a schematic cross-sectional structure shown in FIG. 1 was prepared in the same procedure as in Example 9.

The structure of the disk and the sputtering conditions are summarized in Table 5.

TABLE 5

| Structure | Material | Thickness | Sputtering conditions | | |
|---|---|---|---|---|---|
| | | | Sputtering gas pressure | Sputter-ing gas | Discharge RF power |
| First di-electric layer 2 | AlN | 1300 Å | $1 \times 10^{-2}$ (Torr) | $Ar/N_2$ (partial pressure) (80/20) | 4.2 W/cm$^2$ |
| Magneto-optical recording layer 3 | $(Gd_{0.6}Tb_{0.4})_{24}Fe_{64}Co_{12}$ | 300 Å | $5 \times 10^{-2}$ (Torr) | Ar | 4.2 W/cm$^2$ |
| Second di-electric layer 4 | AlN | 500 Å | $2 \times 10^{-2}$ (Torr) | Ar | 4.2 W/cm$^2$ |
| Metallic layer 5 | $Al_9Nb_1$ | 500 Å | $1 \times 10^{-2}$ (Torr) | Ar | 4.2 W/cm$^2$ |

The present disk was prepared in the same procedure as in Example 9, where the thickness of dielectric layers was determined in view of the refractive index.

The thus prepared disk was subjected to determination of C/N ratio. The C/N ratio was found to be 53 dB (recording period: 1.5 T, number of disk revolutions: 2,400 rpm, lens opening ratio $N_A$: 0.55, recording frequency: 4.93 MHz), which was by 6 dB larger than 4 dB of the comparative disk shown in Example 9, because the difference in the C/N ratio was due to a difference in the Kerr rotational angle.

Then, the disk was subjected to a reliability test. That is, changes in BER with time was determined by holding it at 80° C. - 85% RH, and it was found that no change in BER was observed in the present disk even after 2,000 hours of holding, whereas the BER of the comparative disk shown in Example 9 was largely increased about 15-fold.

EXAMPLE 12

This example show a case of simple disk structure without the first dielectric layer.

Figure 20:
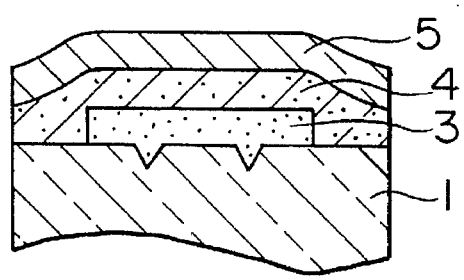

FIG. 20 shows a schematical cross-sectional structure of a magneto-optical disk prepared according to one embodiment of the present invention in the following manner.

$Tb_{23.5}Fe_{54.5}Co_{14}Nb_3Pt_5$, having a high resistance to high temperature oxidation and corrosion such as wet corrosion and pitting corrosion, as a magneto-optical recording layer 3 was deposited on a polycarbonate substrate provided with guide tracks on the surface as a substrate 1 by sputtering an alloy target of the aforementioned composition with a discharge RF power density of 4.2 W/cm$^2$. Initially, a pure $N_2$ gas was used as a sputtering gas to form a 40 Å-thick sputtering layer, and then the sputtering gas was changed to a pure Ar gas and the sputtering was continued to form a 250 Å-thick sputtering layer. Then, the sputtering gas was changed to a pure $N_2$ gas and the sputtering was continued to form a 40 Å-thick sputtering layer. Total sputtering time was 2.5 minutes. By nitriding both boundary surfaces the magneto-optical recording layer in this manner, the corrosion resistance was improved and the adhesion of the magneto-optical recording layer to the plastic substrate of poor adhesiveness could be improved.

Then, the silicon nitride layer as a second dielectric layer 4 was deposited thereon by sputtering a sintered $Si_3N_4$ target with a pure Ar gas as a sputtering gas under a sputtering gas pressure of $2 \times 10^{-2}$ Torr with a discharge RF power density of 4.2 W/cm$^2$ for 1.5 min., whereby the 200 Å-thick $Si_3N_4$ layer was formed.

Finally, an amorphous alloy layer of Al-Ti (Al: 85 at. % and Ti: 15 at. %) as a metallic layer 5 was deposited thereon by sputtering an Al-Ti alloy target with an Ar gas as a sputtering gas under a sputtering gas pressure of $1 \times 10^{-2}$ Torr and a discharge RF power density of 3.1 W/cm$^2$ for 2 minutes, whereby the 500 Å-thick metallic layer 5 was formed.

The thus prepared magneto-optical disk was subjected to evaluation tests as given below. As Comparative Example, a magneto-optical disk of the structure as shown in Table 6 was used.

TABLE 6

| Structure | Material | Thickness | Sputtering time (min.) |
|---|---|---|---|
| Underlayer | $Si_3N_4$ | 850 Å | 6.5 |
| Magneto-optical recording layer | TbFeCoNbPt | 800 Å | 3.5 |
| Protective layer | $Si_3N_4$ | 1500 Å | 9 |

The compositions of the substrate and the magneto-optical recording layer of the comparative disk were the same as those of the present disk, except no nitriding treatment was carried out on the magneto-optical recording layer.

Figure 21:
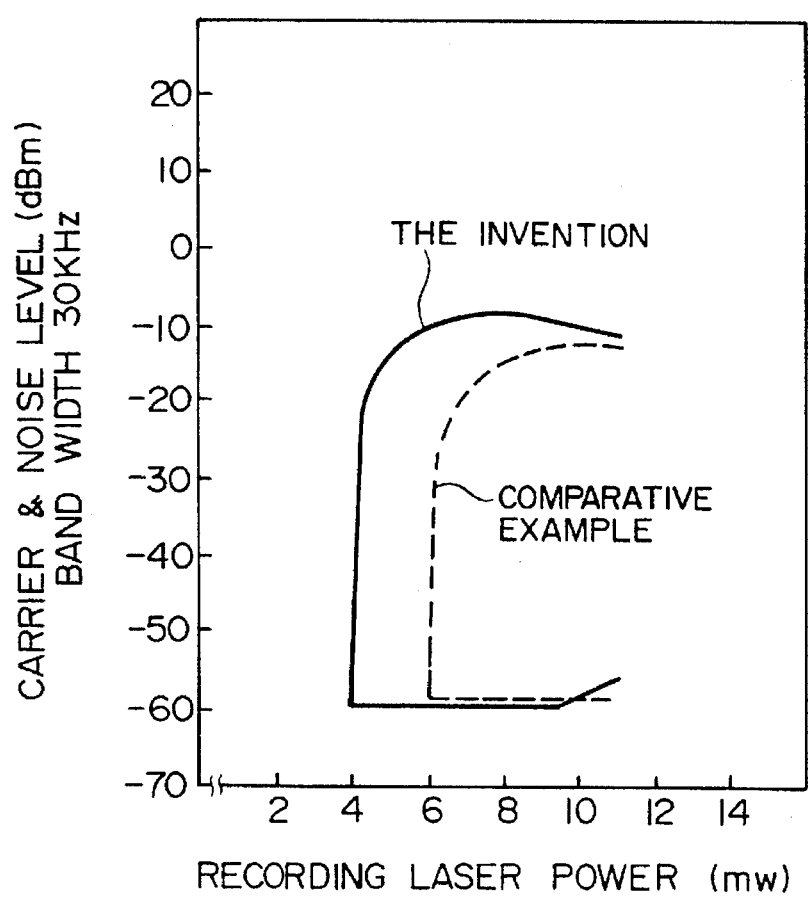

In FIG. 21, dependence of reproduced output on the laser power, measured by allowing the laser beam to enter the disk through the substrate, is shown. The measurement was made at a position, 30 mm distant from the disk center with the number of disk revolutions of 1,800 rpm, a lense opening ratio $N_A$ of 0.55 and a pulse width of 70 n sec. The present disk of the foregoing structure could be written with a minimum recording power of 4 mW, which was lower than 6 mW of the comparative disk. This shows that the present disk had a higher sensitivity. The C/N ratio obtained was under the most severe recording conditions, wherein the present disk had 49 dB, which was about 5 dB larger than 44 dB of the comparative disk. The present disk was not provided with the underlayer, but had characteristics equivalent or superior to those of the four-layer structure.

Figure 22:
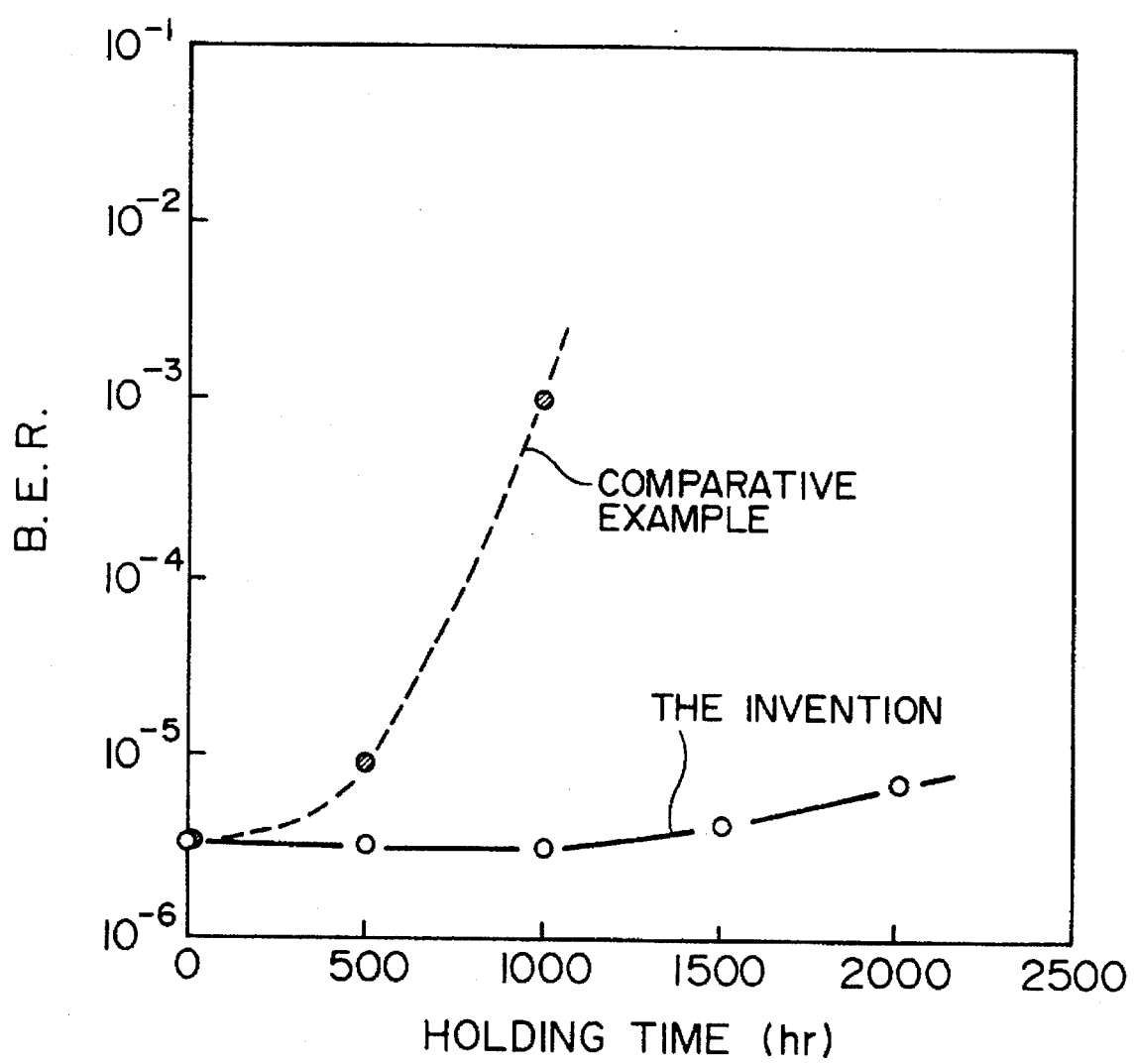
FIG. 22 shows changes with time in the bit error rate (BER) when the magneto-optical disk is held at 80° C. -85% RH.

The present disk and the comparative disk were subjected to a reliability test by holding them at 80° C.-85% RH to measure changes in bit error rate with time. FIG. 22 shows the results of the reliability test. As is obvious from FIG. 22, the bit error rate of the present disk was $4 \times 10^{-6}$ errors per bit in the initial period of the test which was kept constant 1,000 hours after the holding at 80° C.-85% RH, and then was slowly increased to reach $7 \times 10^{-6}$ errors per bit 2,000 hours after the holding. On the other hand, the bit error rate of the comparative disk was rapidly increased, for example, $1 \times 10^{-5}$ errors per bit 500 hours after the holding and $10^{-3}$ errors per bit 1,000 hours after the holding. Furthermore, peeling of the layer took place in the comparative disk.

The present disk of simplified disk structure without any underlayer had a long duration without lowering the recording/reproduction characteristics. Also, the disk production time could be shortened to less than one-third of the production time of four-layer structure disks. Furthermore, the production time of each layer was substantially the same and there was no production rate-controlling step and thus the disks could be smoothly produced, as for mass production.

When Al, Ti, Ta or Cr was used in place of Nb and Rh, Rb or Au was used in place of Pt as the elements for the magneto-optical recording layer, the resulting disks had equivalent disk duration and characteristics to those of the above-mentioned present disk.

The present magneto-optical disks of simple structure with a long duration could be produced with a low cost polycarbonate substrate and thus could fully satisfy domestic applications such as rewrittable compact disks.

With respect to the static characteristics of the present disk, the Kerr rotational angle $\theta_K$ could be increased to 0.65°, which was approximately twice the Kerr rotational angle of the disk only with the magneto-optical recording layer (thickness: 1,000 Å), i.e. 0.34°, but the reflectivity R was decreased to 24%, which was less than a half of the latter disk, i.e. 50%.

EXAMPLE 13

Magneto-optical disks having a schematic cross-sectional structure shown in FIG. 20 were prepared in the same procedure as in Example 12.

A magneto-optical recording layer 3 was formed on a glass substrate 1 provided with guide tracks in the same manner as in Example 12, except that $(Gd_{0.6}Dy_{0.4})_{24}Fe_{49}Co_{17}(Rh_{0.7}Cr_{0.3})_{10}$ was used as a target. Then, a second dielectric layer 4 of SiO was formed thereon by sputtering. Besides $SiO_2$ the second dielectric layer was also prepared from SiN, AlN, $SiO_2$, $Al_2O_3$, $SnO_2$ or 95 $ZrO_2$ - 5 $Y_2O_3$ at the same time. The conditions for forming the second dielectric layer 4 were the same as in Example 12 except that a gas mixture of Ar/O$_2$ (90/20 in partial pressure ratio) was used so that the respective oxides could have stoichiometric compositions. Then, a metallic layer 4 was formed thereon by sputtering under the same conditions as in Example 12 except that Al$_{0.9}$Ni$_{0.1}$ was used as a target.

Then, the thus prepared disks were subjected to comparison in the disk recording sensitivity in the following manner. Recording was carried out at the position of the disk, 60 mm distant from the disk center with a continuous laser beam of a given power and the recording domains were inspected with a polarizing microscope to measure the domain width and determine a necessary laser power for obtaining 1.3 μm width, which was necessary for the complete erasing. The disk was turned at 2,400 rpm.

Table 7 shows the results of the measurements.

The thermal diffusivity could be changed by changing the material in the second dielectric layer 4, even if the disk structure was the same, and the necessary power for forming the domain width of 1.3 μm could be adjusted. This effect was true of such oxides as WO$_3$, Ta$_2$O$_3$, TiO$_2$, MoO$_3$, Nb$_2$O$_3$, PbO, PbO$_2$, etc., where the disk recording sensitivity could be changed in accordance to the thermal diffusivity specific to those oxides.

TABLE 7

| Materials for second dielectric layer | Thermal diffusivity | Minimum power necessary for obtaining 1.3 μm domain width | Sputtering gas (ratio in partial pressure) |
| --- | --- | --- | --- |
| Al$_2$O$_3$ | 30.3 J/sec · m · deg | 7.5 mW | Ar/O$_2$ = 90/10 |
| Si$_3$N$_4$ | 2.5 J/sec · m · deg | 6.0 mW | Ar/N$_2$ = 80/20 |
| AlN | 2.8 J/sec · m · deg | 6.0 mW | Ar/N$_2$ = 80/20 |
| SnO$_2$ | 7.2 J/sec · m · deg | 6.5 mW | Ar/O$_2$ = 90/10 |
| ZrO$_2$—Y$_2$O$_3$ | 2.0 J/sec · m · deg | 5.5 mW | Ar/O$_2$ = 90/10 |
| SiO$_2$ | 0.9 J/sec · m · deg | 5.0 mW | Ar/O$_2$ = 80/20 |

EXAMPLE 14

Magneto-optical disks having a schematic cross-sectional structure shown in FIG. 20 were prepared in the same procedure as in Example 12.

Initially, a magneto-optical recording layer 3 of Tb$_{24}$Fe$_{59}$Co$_{12}$Nb$_5$ was formed by sputtering on a glass disk substrate 1 provided with guide tracks on the surface by a photopolymer process (2p process). The sputtering conditions were the same as in Example 12, except that an alloy target of the above-mentioned composition was used as a target.

Then, a second dielectric layer 4 of silicon nitride was formed thereon by sputtering under the same conditions as in Example 12, and finally a metallic layer 4 of Al, Al$_{0.85}$Ti$_{0.15}$ or Al$_{0.70}$Ti$_{0.30}$ was formed thereon by sputtering under the same conditions as in Example 12. Besides the foregoing three kinds of the metallic layer, a metallic layer 3 of Au, Au$_{0.9}$Cr$_{0.5}$ or Au$_{0.8}$Cr$_{0.2}$ was likewise formed on the second dielectric layer 4.

The thus prepared disks were subjected to a measurement of domain width in the same manner as in Example 13. Table 8 shows the results of the measurements.

TABLE 8

| Material for metallic layer 4 | Minimum power necessary for obtaining 1.3 μm domain width |
| --- | --- |
| Al | 7.0 mW |
| Al$_{0.35}$Ti$_{0.15}$ | 6.5 mW |
| Al$_{0.70}$Ti$_{0.30}$ | 5.5 mW |
| Au | 8.0 mW |
| Au$_{0.9}$Cr$_{0.1}$ | 7.0 mW |
| Au$_{0.3}$Cr$_{0.2}$ | 6.0 mW |

The disk writing sensitivity could be selected as desired by adding such as element as Ti, Cr, etc. to the host element such as Al or Au, thereby controlling the additive element concentration and thus controlling the thermal diffusivity, because the temperature distribution on the magneto-optical recording layer could be changed. The same effect was obtained by adding Ni, Ti, Ta, Cr, Nb, Zr, or Si to Cu, Rh or Pt as the host element, thereby controlling the thermal diffusivity. On the other hand, the thermal diffusivity was significantly lowered by adding to Al, Au, Rh, Pt, Cu, etc. as the host elements other elements than the host elements or Ni, Ti, Ta, Cr, Nb, Zr, or Si. By utilizing these phenomena, the thermal diffusivity or, further, the disk recording or erasing sensitivity could be controlled.

EXAMPLE 15

Figure 23:
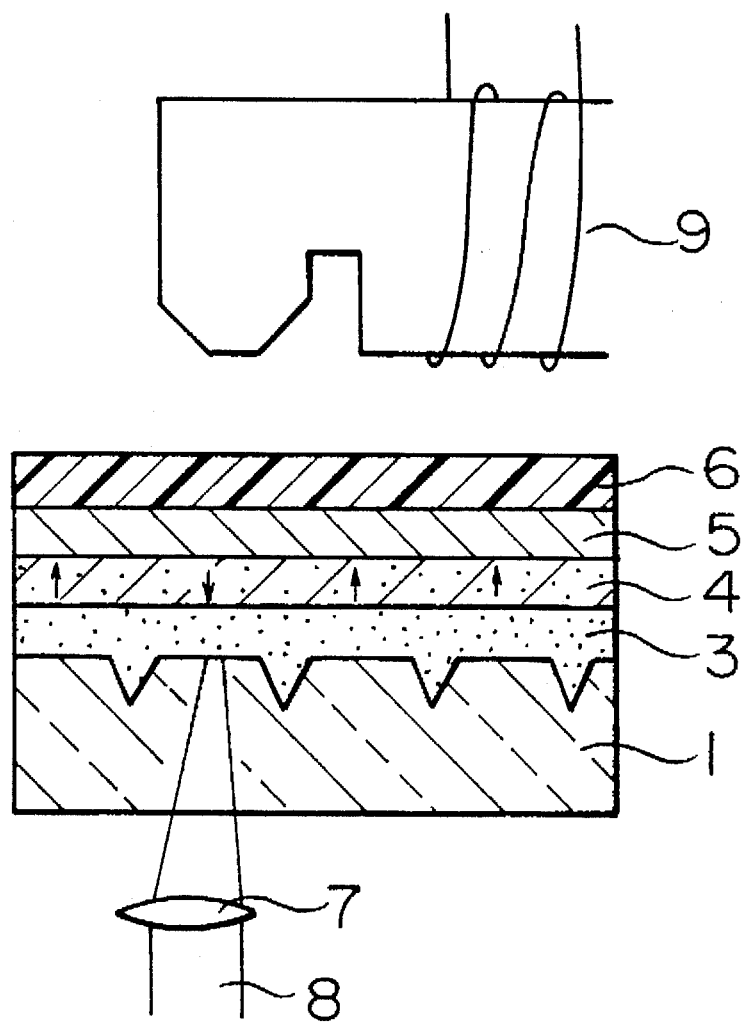
FIG. 23 is a schematic view showing a field modulation recording apparatus with a flying magnetic head.

A magneto-optical disk having a schematic cross-sectional structure shown in FIG. 20 was prepared in the same procedure as in Example 12. An overcoat layer 6 of ultraviolet-curing resin (UV resin) was formed on the outer surface of the disk, as shown in FIG. 23. Then, as shown in FIG. 23, the disk was irradiated with a laser beam focused through a lens, and CD signals were recorded thereon while modulating the magnetic field by a flying type magnetic head 9. The disk was turned at 900 rpm. When the recorded signals were reproduced, good reproduced signals were obtained having lower noises. Thus, the present disk could be used as a rewrittable compact disk.

The present disk can be fully utilized in the domestic applications such as domestic electric apparatuses and also can be applied to communication fields such as voice and image recording as well as fascimile image recording. Still furthermore, a magneto-optical recording film of double or multiple layer magnetically coupled with an auxiliary magnetic field as an overwrite system can be used in the present disk.

As described in the foregoing, a highly reliable magneto-optical disk can be provided according to the present invention by providing a metallic layer as a fourth layer and controlling the material and thickness of the metallic layer and the layer structure, thereby controlling the temperature distribution of the magneto-optical recording layer without any fluctuation in the reproduced output when recording/reproduction/erasing were repeated, because the structural relaxation of the amorphous magneto-optical recording layer can be controlled thereby. With the present structure, only the Kerr rotational angle (including the Faraday rotational angle) can be largely increased without any substantial decrease in the reflectivity and a higher reproduced output can be obtained. Thus, the disk characteristics can be much improved. Furthermore, the Kerr rotational angle (i.e. C/N ratio) can be improved by concentrating a material of higher reflectivity at the recording layer side and a material of higher corrosion resistance at the opposite side in the metallic layer and the corrosion resistance of the metallic layer can be obtained at the same time. By controlling the thermal diffusivity, the recording or erasing sensitivity of the disk can be controlled and the matching to the disk drive can be improved.

Still furthermore, according to the present invention, the thermal capacity and the thermal diffusivity of the magneto-optical recording medium on the whole can be controlled by changing the thickness and the thermal diffusivity of the respective layers that constitute the magneto-optical recording medium and consequently the shape of the recording domains can be controlled when recording is carried out by field modulation. In specific, the tails of arrow feather-shaped recording domains peculiar to the field modulation recording can be shortened. Thus, a magneto-optical recording medium capable of giving better recording and reproduction characteristics can be obtained even by high density recording, whereby the overwriting can be made possible and the disk characteristics can be improved.

Still furthermore, according to the present invention, the Kerr enhancement action can be endowed to the second dielectric layer and thus the thickness of the first dielectric layer does not depend on the optical characteristics (thickness that causes multiple interference of light). Thus, the thickness of the first dielectric layer can be selected only in view of the protective effect, and thus the magneto-optical recording layer can be prevented from corrosion through the substrate, resulting in a remarkable effect on a higher reliability and a longer duration of the disk. Furthermore, by endowing the Kerr enhancement action to the second dielectric layer, the difference in the refractive index between the second dielectric layer and the layers at both sides of the second dielectric layer can be made larger than that when the Kerr enhancement action is endowed to the first dielectric layer, and thus the reproduced output can be effectively increased, because in that case the Kerr rotational angle can be increased without lowering the reflectivity.

Finally, in the case of a magneto-optical disk consisting of only three layers, i.e. a magneto-optical recording layer, a second dielectric layer and a metallic layers, laid successively on a substrate, without the first dielectric layer, an equivalent carrier/noise ratio to that of a disk with the underlayer can be obtained, and a magneto-optical disk with a considerably long duration can be obtained even if the substrate is a plastic substrate. Furthermore, since the time required for the respective steps of preparing the respective layers is equal or shorter, the mass production can be carried out simply. By controlling the thermal diffusivity of the second dielectric layer and the metallic layer, the temperature distribution of the magneto-optical recording medium can be changed and the disk recording or erasing sensitivity can be set as desired.

In this manner, the disk structure can be simplified in the present invention without lowering the disk characteristics, and thus the present magneto-optical disk can be used in the domestic applications such as domestic electric apparatuses or in communication field of recording fascimile images or buffer memory, etc.

As described above, a magneto-optical disk of high reliability, capable of controlling the structural relaxation of the amorphous magneto-optical recording layer, can be provided according to the present invention by forming a metallic layer of heat diffusion as a fourth layer.

What is claimed is:

1. A method of magneto-optically recording information with reduced elongation magnetic domain shape on a magneto-optical disk comprising the steps of: selecting a reduced elongation magnetic domain shape, forming a disk substrate, laying a first dielectric layer on the disk substrate, laying a magneto-optical recording layer, selecting a thickness for a second dielectric layer, a Kerr effect of said second dielectric layer exceeding a Kerr effect of said first dielectric layer, laying the second dielectric layer to the selected thickness on the magneto-optic recording layer, selecting a thermal diffusivity for a metallic layer, and laying said metallic layer on said second dielectric layer, the thermal diffusivity of said metallic layer and the film thickness of said second dielectric layer being set based on the selected domain shape;

moving a substantially continuously irradiating light beam at a constant power level parallel to surface of said magneto-optical disk; and applying a modulation magnetic field to the magneto-optical disk concurrent with the step of moving said substantially continuously irradiating light beam to form magnetic domains of the selected shape in said magneto-optical recording layer.

2. A method of magneto-optically recording information with reduced elongation magnetic domain shape on a magneto-optical disk comprising the steps of: selecting a reduced elongation magnetic domain shape, forming a disk substrate, laying a first dielectric layer on the disk substrate, laying a magneto-optical recording layer, selecting a thickness for a second dielectric layer, laying the second dielectric layer to the selected thickness on the magneto-optic recording layer, selecting a thermal diffusivity for a metallic layer, and laying said metallic layer on said second dielectric layer, the thermal diffusivity of said metallic layer and the film thickness of said second dielectric layer being set based on the selected domain shape;

moving a substantially continuously irradiating light beam at a constant power level parallel to surface of said magneto-optical disk; and applying a modulation magnetic field to the magneto-optical disk concurrent with the step of moving said substantially continuously irradiating light beam to form magnetic domains of the selected shape in said magneto-optical recording layer, wherein the step of laying the second dielectric layer includes the step of selecting a thickness and an index of refraction for said layer to impart a rotation of a polarization angle of said laser beam by multiple reflection interference action within said second dielectric layer, and wherein the step of laying the first dielectric layer includes the step of selecting a thickness and an index of refraction relative to the selected thickness and index of refraction of said second dielectric layer so that said steps of moving a substantially continuously irradiating light beam at a constant power level and applying a modulation magnetic field to the magneto-optical disk cause said rotation of a polarization angle of a laser beam by multiple reflection interference action within said second dielectric layer to exceed a rotation caused by multiple reflection interference within said first dielectric layer.

3. The method according to claim 1, wherein the step of forming said substrate forms the substrate with guide tracks and the step of laying said first dielectric layer lays an inorganic compound, and said step of laying a magneto-optical recording layer includes a step of selecting a first index of refraction for said layer and selecting and laying a material with a perpendicular magnetization anisotropy consisting of an alloy of at least one element selected from the group consisting of Gd, Tb, Dy, Ho and at least one of Fe and Co, and wherein the step of laying said second dielectric layer includes a step of selecting a a second index of refraction for said second dielectric layer, said second index being different from said first index of refraction by at least 0.4 and laying an inorganic compound having said second index, and wherein said step of laying a metallic layer includes a step of selecting a third index of refraction for said layer, said third index being different from said second index of refraction by at least 0.4, and laying a metallic layer having said third index.

4. The method according to claim 1, wherein the step of forming said substrate forms the substrate with guide tracks and the step of laying said first dielectric layer lays an inorganic compound, and said step of laying a magneto-optical recording layer includes a step of selecting a first index of refraction and selecting and laying a material having said first index with a perpendicular magnetization anisotropy consisting of an alloy of at least one element selected from the group consisting of Gd, Tb, Dy, Ho and at least one of Fe, Co and at least one of Nd, Pr, Ce, Sm, wherein said step of laying the second dielectric layer includes a step of selecting a second index of refraction different from said first index of refraction by at least 0.4, selecting and laying an inorganic compound having said second index, and wherein said step of laying said metallic layer includes a step of selecting a third index of refraction different from said second index of refraction by at least 0.4 and selecting and laying a metallic layer having said third index.

5. The method according to claim 2, wherein the step of forming said disk substrate forms the substrate with guide tracks and wherein the step of laying said metallic layer includes a step of laying a first layer of a reflective material on said second dielectric layer and laying a second layer of a corrosion-resistant material on said first layer.

* * * * *